(12) United States Patent
Shirai

(10) Patent No.: US 7,567,354 B2
(45) Date of Patent: Jul. 28, 2009

(54) IMAGE COPYING DEVICE

(75) Inventor: Takaaki Shirai, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1131 days.

(21) Appl. No.: 10/813,272

(22) Filed: Mar. 31, 2004

(65) Prior Publication Data

US 2004/0190084 A1  Sep. 30, 2004

(30) Foreign Application Priority Data

Mar. 31, 2003   (JP)   ............................... 2003-093389

(51) Int. Cl.
*G06K 15/00* (2006.01)
*H04N 1/04* (2006.01)
(52) U.S. Cl. ...................... 358/1.12; 358/474; 358/1.16
(58) Field of Classification Search ............ 358/426.05, 358/426.06, 474, 475, 400, 404, 444, 443, 358/448, 401, 496, 498, 1.16, 1.18, 1.12
See application file for complete search history.

(56) References Cited

U.S. PATENT DOCUMENTS

| | | | | |
|---|---|---|---|---|
| 5,703,693 | A | * | 12/1997 | Morikawa .................... 358/296 |
| 5,940,543 | A | * | 8/1999 | Isemura et al. .............. 382/284 |
| 6,982,805 | B2 | * | 1/2006 | Yoshida ....................... 358/1.15 |
| 2001/0035973 | A1 | * | 11/2001 | Kusumoto ................... 358/1.14 |
| 2002/0041384 | A1 | * | 4/2002 | Moriura et al. .............. 358/1.9 |
| 2004/0170452 | A1 | * | 9/2004 | Hayashi et al. ............. 399/309 |
| 2007/0069448 | A1 | * | 3/2007 | Honda ......................... 271/145 |
| 2008/0080016 | A1 | * | 4/2008 | Narukawa .................... 358/449 |

FOREIGN PATENT DOCUMENTS

| | | |
|---|---|---|
| JP | A 4-65259 | 3/1992 |
| JP | A 7-131601 | 5/1995 |
| JP | A 2001-80160 | 3/2001 |
| JP | A 2001-245097 | 9/2001 |
| JP | A 2002-99180 | 4/2002 |
| JP | A 2002-158842 | 5/2002 |

* cited by examiner

*Primary Examiner*—Jerome Grant, II
(74) *Attorney, Agent, or Firm*—Oliff & Berridge PLC

(57) ABSTRACT

A copy machine completes the reading in of the front surfaces of a plurality of documents, before starting reading in of the rear surfaces of the documents, and starts forming images before the reading in of the rear surfaces of all the documents has been completed. After the front surfaces of all the plurality of documents have been read in, the reading of the rear surfaces starts. It takes a period of time from a time T2 to a time T7 to read in image data of a quantity (Q2−Q1) from the rear surface of one document as apparent from a line segment 200a that is indicative of the speed at which the read-in image data is stored. The timing of printing start is offset to ensure that the line segment 200a and the line segment 300b do not intersect with each other. This makes it possible to start printing based on image data for the rear surface of the document while the reading of the subject surface of the subject document. It is possible to prevent the image data from running out regardless of the difference between the storing speed and the read-out speed.

22 Claims, 14 Drawing Sheets

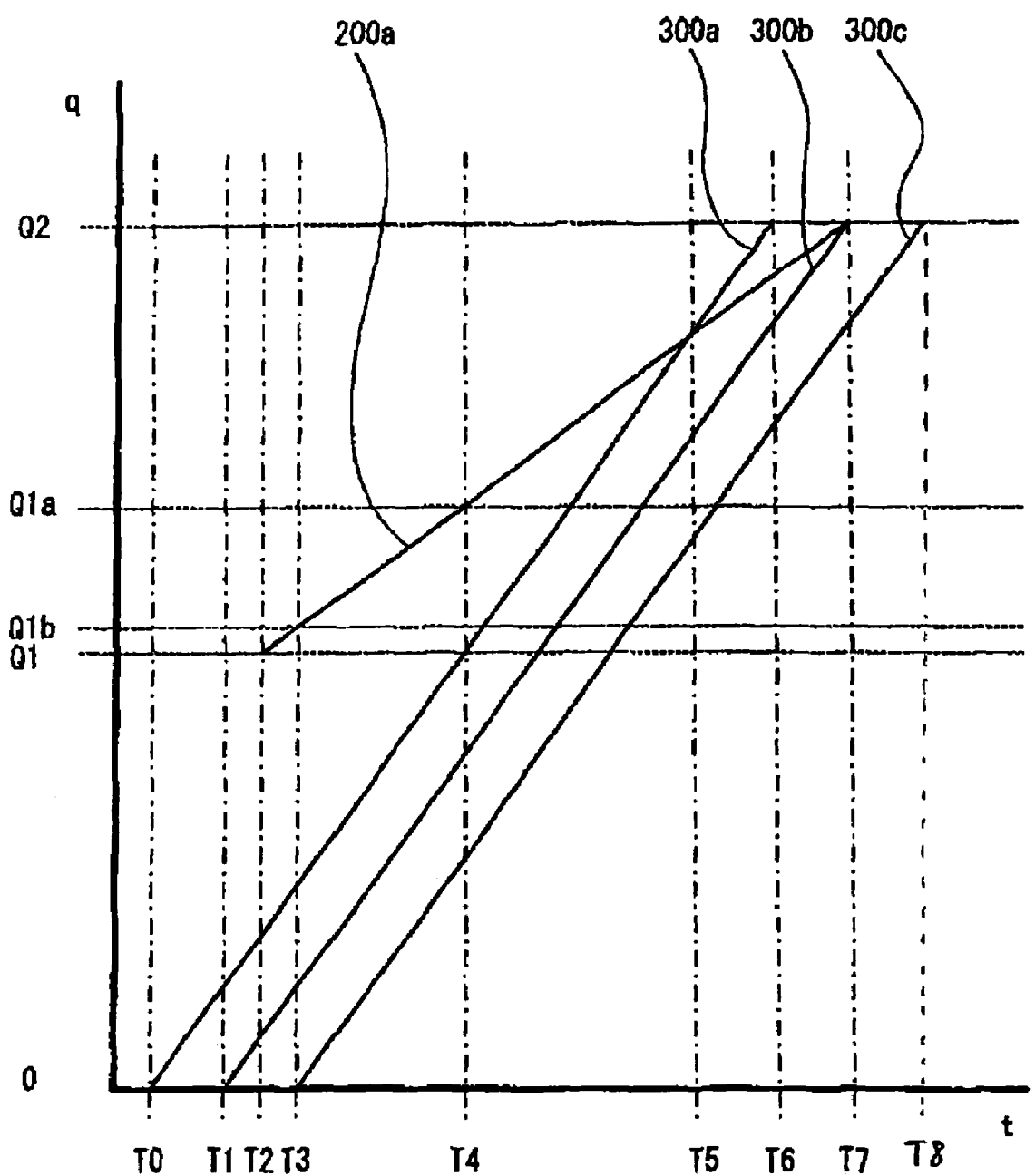

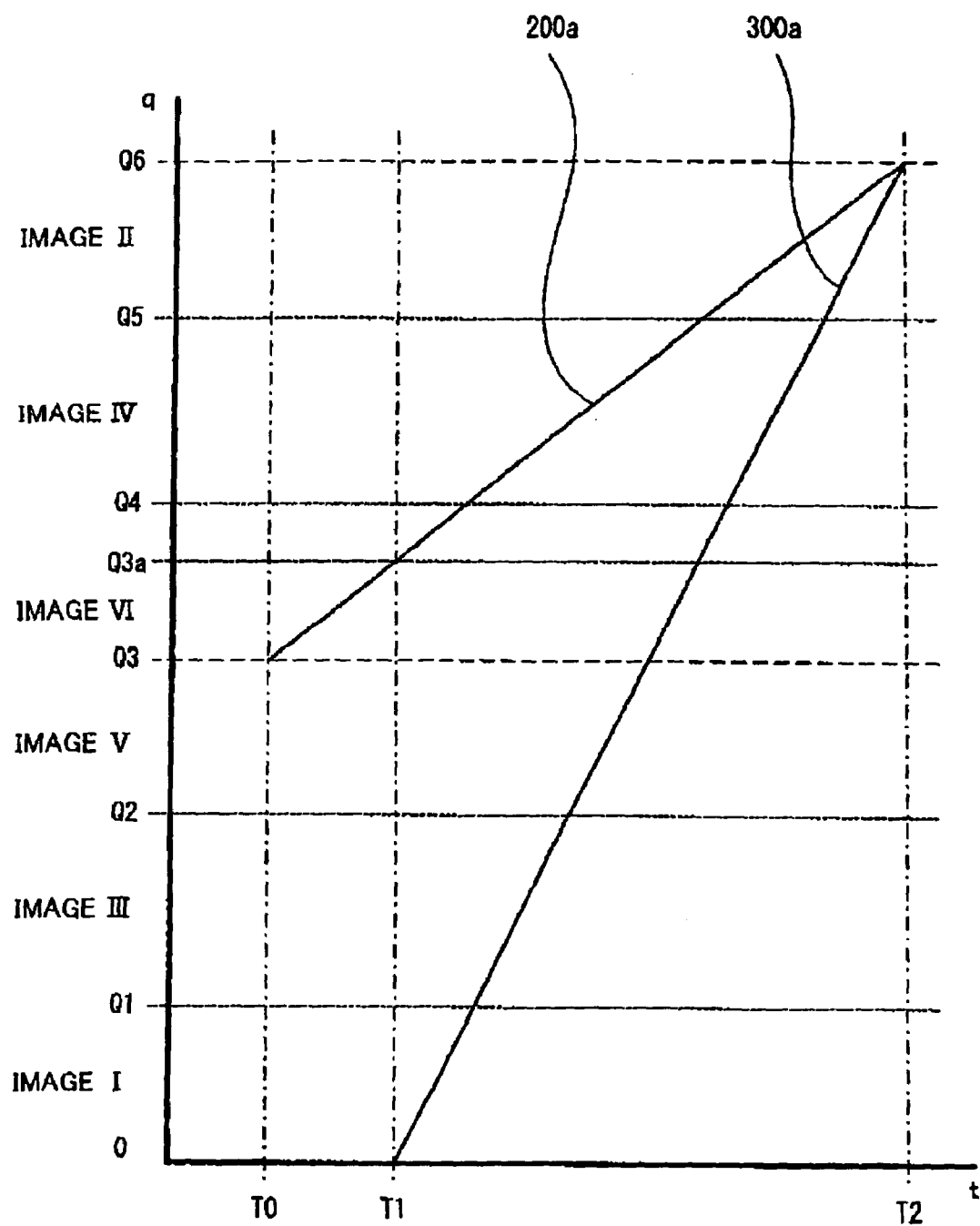

IMAGE COPYING DEVICE

BACKGROUND OF THE INVENTION

1. Field of the Invention

The present invention relates to an image copying device.

2. Description of Related Art

A conventional image copying device is provided with an automatic document feeder (ADF) for automatically supplying documents to an image reading device, such as a charge-coupled device (CCD) or contact image sensor (CIS), in order to read in a plurality of documents sequentially. The image copying device produces copy products of the thus-read-in documents, by forming the read-in images on a recording medium by using an image forming device such as an inkjet type recording device or a laser type recording device.

The ADF is generally provided with no document-reversing mechanism. It is necessary for the operator to turn over the pages when copying documents with images formed on both surfaces thereof. In order to copy a plurality of documents with images formed on both sides thereof, the documents are sequentially supplied by the ADF so that the images on the first surfaces (the surfaces of the documents that are read in first, such as the front surfaces) are read in first by a CCD sensor or the like. Thereafter, the images on the other sides of the documents (the surfaces of the documents that are read in after, such as the rear surfaces) are read in in the same manner as described above. Then, images are formed based on the read-in image data.

In this way, the images on the front surfaces of the documents are read in first, and then the images on the rear surfaces of the documents are read in. This manner reduces the work of re-inserting the documents and is more convenient for the operator, in comparison with a conceivable method in which both surfaces of the first document are read in first, both surfaces of the next document are read in next, and both surfaces of the subsequent documents are read in in the same manner as described above.

According to Japanese Unexamined Patent Application Publication No. 7-131601, image data for the front surfaces of all the read-in documents and image data for the rear surfaces of all the read-in documents are stored in a storage device such as RAM. The image data for the front surface of each document is linked to the image data for the rear surface of the same document. A pair of sets of image data that are linked in this manner for each document are formed on a pair of opposite surfaces of a single recording medium, thereby producing a copy product of the subject document.

SUMMARY OF THE INVENTION

However, according to the Publication No. 7-131601, images are started being formed after image data for the front and rear surfaces of all the documents has been read in. The entire process of copying documents takes a long time from start to finish, which is a burden on the operator. Because the image data for the front and rear surfaces of all the documents is stored in the RAM, the RAM requires a large storage capacity.

In view of the above-described drawbacks, it is an objective of the present invention to provide an improved image copying device that has a simple configuration but that can highly efficiently copy documents that have images formed on both sides thereof.

In order to attain the above and other objects, the present invention provides an image copying device, including: a reading portion; a storage portion; an image forming portion; a reading control portion; and an image forming control portion. The reading portion reads in an image formed on one surface of a document. The storage portion stores image data that is read in by the reading portion. The image forming portion forms an image on a recording medium based on the image data stored in the storage portion. The reading control portion provides control such that, when a plurality of documents having images formed on both sides thereof are to be read by the reading portion, images formed on one surfaces of the documents are read in sequentially and are stored sequentially in the storage portion, and then, after the reading in of the one surfaces of the documents is completed, images on the other surfaces of the documents are read in sequentially and are stored sequentially in the storage portion. The image forming control portion reads out, from the storage portion, image data for the one surfaces of the documents and the corresponding image data of the other surfaces of the documents, controls the image forming portion to form images sequentially on the recording medium based on the image data, and causes the start of the forming of images on the recording medium by the image forming portion before the reading in of all of the other surfaces of the documents by the reading portion has been completed.

According to another aspect, the present invention provides an image copying device, including: a reading portion; a storage portion; an image forming portion; and a controller. The reading portion reads in an image formed on one surface of a document. The storage portion stores image data that is read in by the reading portion. The image forming portion forms an image on a recording medium based on the image data stored in the storage portion. The controller provides control such that, when a plurality of documents having images formed on both sides thereof are to be read by the reading portion, images formed on one surfaces of the documents are read in sequentially and are stored sequentially in the storage portion, and then, after the reading in of the one surfaces of the documents is completed, images on the other surfaces of the documents are read in sequentially and are stored sequentially in the storage portion. The controller reads out, from the storage portion, image data for the one surfaces of the documents and the corresponding image data of the other surfaces of the documents, controls the image forming portion to form images sequentially on the recording medium based on the image data, and causes the start of the forming of images on the recording medium by the image forming portion before the reading in of all of the other surfaces of the documents by the reading portion has been completed.

BRIEF DESCRIPTION OF THE DRAWINGS

The above and other objects, features and advantages of the invention will become more apparent from reading the following description of the preferred embodiments taken in connection with the accompanying drawings in which:

FIG. 11 is a graph indicative of a relationship between the speed at which image data is stored into a storage area when the image data is read in, and the speed at which image data is read out for printing;

FIG. 12($b$) is a flowchart according to the third modification and corresponding to FIG. 9.

DETAILED DESCRIPTION OF THE PREFERRED EMBODIMENT

Figure 1:
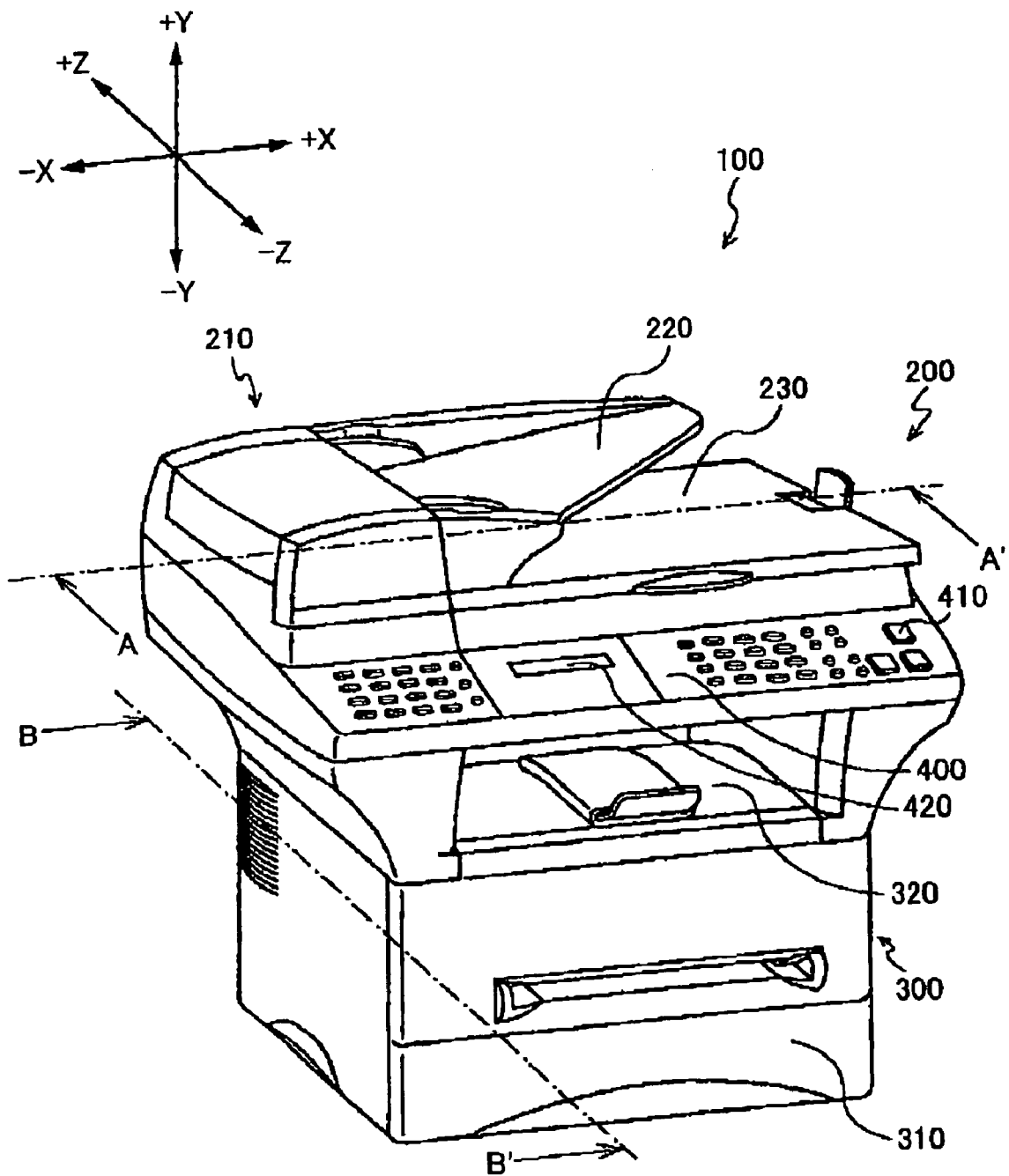
FIG. 1 is a perspective view of a copy machine according to an embodiment of the present invention.

A copy machine according to a preferred embodiment of the present invention will be described while referring to the accompanying drawings wherein like parts and components are designated by the same reference numerals to avoid duplicating description.

First, the overall configuration of the copy machine 100 of the present embodiment will be described with reference to FIGS. 1 to 3.

Note that in the description of the present embodiment, the forward direction, the left-hand direction, the right-hand direction, the rearward direction, the upward direction, and the downward direction of the copy machine 100 are assumed to be a −Z direction, a −X direction, a +X direction, a +Z direction, a +Y direction, and a −Y direction, respectively.

As shown in FIG. 1, the copy machine 100 includes: an image reading portion 200 that reads in documents; an image forming portion 300 that forms images on a recording medium based on the read-in image data of the documents; and an operating portion 400 used for operating the copy machine 100. The image forming portion 300 has a substantially cubical form, on which is mounted the image reading portion 200 that has a substantially parallelepiped form whose length is greater than that of the image forming portion 300. The image reading portion 200 is oriented with a longitudinal axis extending in the left-and-right (lateral) direction (X-axis direction) of the copy machine 100. The operating portion 400 protrudes from the image reading portion 200 further outward than the front surface side (the −Z direction) of the copy machine 100.

Within the image reading portion 200, at the left edge thereof, an ADF (automatic document feeder) 210 is provided to extend across the image reading portion 200 along its widthwise direction (the Z-axis direction). According to the ADF 210, documents that are stacked on top of a supply tray 220 are fed, are read by a CCD image sensor 211 (FIG. 2), which is provided in the image reading portion 200, and are discharged onto a discharge tray 230.

The supply tray 220 protrudes in a plate shape so as to form an inclined surface which extends diagonally upwardly to the right from the ADF 210. The documents can be held in a stack on the supply tray 220. A document detection sensor 221 (FIG. 2) is provided in the supply tray 220. The document detection sensor 221 employs a photosensor or the like, and detects whether or not documents are placed on the tray 220.

The discharge tray 230 is provided below the supply tray 220. The discharge tray 230 extends substantially horizontally to the right from the ADF 210 at a region between the two edges of the image reading portion 200 in the left-and-right (lateral) direction (the X-axis direction). The discharge tray 230 holds the documents discharged from the ADF 210 in a stack.

A glass plate 212 (FIG. 2) is provided below the discharge tray 230. The discharge tray 230 can be opened and closed. More specifically, the discharge tray 230 is capable of pivoting about an axis (not shown), which is provided on the rear-surface side of the copy machine 100 and which extends in the X-axial direction. When the discharge tray 230 is opened, the front side of the discharge tray 230 moves upwardly together with the ADF 210 and the supply tray 220, as a result of which the glass plate 212 is exposed. The glass plate 212 is made of a transparent glass plate, and is for mounting thereon a document to be read in according to a so-called flat-bed reading method.

Figure 2:
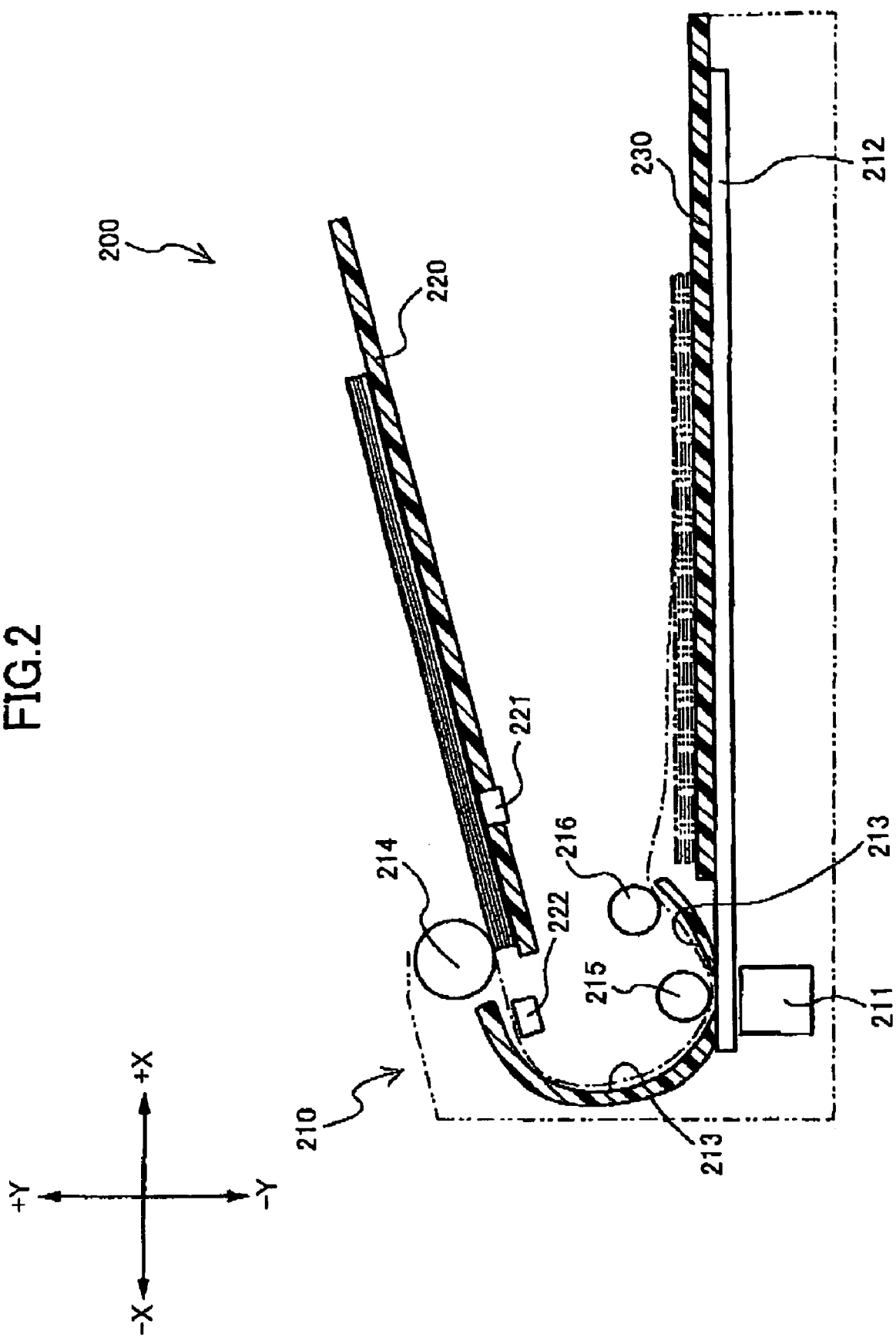
FIG. 2 illustrates a section of an essential part of an image reading portion in the copy machine of FIG. 1, taken along the broken line A-A' in FIG. 1.

As shown in FIG. 2, a feed path 213 is provided in the interior of the image reading portion 200 to extend in an arc shape. The feed path 213 is for guiding the documents. A document mounted on top of the supply tray 220 is guided along the fed path 213 to confront the CCD image sensor 211 with the glass plate 212 being located between the document and the CCD image sensor 211 before reaching the discharge tray 230.

A supply roller 214 is provided at one end of the feed path 213 in the document-feed direction. The supply roller 214 is for guiding the uppermost one in the stack of the documents into the feed path 213. A pressure roller 215 is provided at a position along the feed path 213 and faces the CCD image sensor 211. The pressure roller 215 is for pressing each document against the glass plate 212 when the document passes by the CCD image sensor 211.

A discharge roller 216 is provided at the other end of the feed path 213 in the document-feed direction. The discharge roller 216 is for discharging the document onto the discharge tray 230. A passage detection sensor 222 is provided at a position along the feed path 213 and close to the supply roller 214. The passage detection sensor 222 is for detecting whether or not a document has passed.

The speed, at which documents are fed by the ADF 210, is previously determined through an experiment. It is possible to estimate the length of each document in the direction of feed by measuring the period of time from the timing when detection of the subject document starts (the timing at which the leading edge of the document is detected by the passage detection sensor 222) to the timing when the detection of the document ends (the timing at which the trailing edge of the document is detected by the passage detection sensor 222). In addition, if the detection of the document does not end even after a predetermined period of time has elapsed, it is known that a paper-jam has occurred.

The CCD image sensor 211 is a linear sensor that extends in a direction (Z-axis direction in FIG. 1), which is orthogonal to the feed direction (X-axis direction) of the documents. The CCD image sensor 211 has a plurality of photodiodes (not shown) that are arranged in the extension direction (Z-axis direction). The photodiodes receive light that is reflected off the document when a light from a light source (not shown) has been irradiated on the document, and then convert the strength (brightness) of the light reflected at each pixel of the document into an electrical signal. An A/D converter 550 (FIG. 4) in the image reading portion 200 converts the signal into digital data, thereby reading in the image formed on the document as image data.

The reading of a document can be executed by placing the document on top of the glass plate 212 (flat-bed reading mode) or by using the ADF 210 (ADF reading mode). In the flat-bed reading mode, the CCD image sensor 211 is moved in the right-and-left (lateral) direction (X-axis direction) along the surface of the glass plate 212, during which time the document placed on the glass plate 212 is read in one line at a time. In the ADF reading mode, the CCD image sensor 211 is moved to the left edge of the glass plate 212, where the CCD image sensor 211 faces the pressure roller 215 through the glass plate 212, and is fixed at the position. The document is fed through by the ADF 210, and is read in one line at a time.

As shown in FIG. 1, a paper supply cassette 310 is provided in the bottom portion of the image forming portion 300 in such a manner that the paper supply cassette 310 can be inserted into and removed from the front side of the copy machine 100. The paper supply cassette 310 holds therein a stack of paper as a recording medium.

A paper discharge tray 320 is provided in an upper portion of the image forming portion 300, and is for holding a stack of paper that has been discharged after being printed images.

Figure 3:
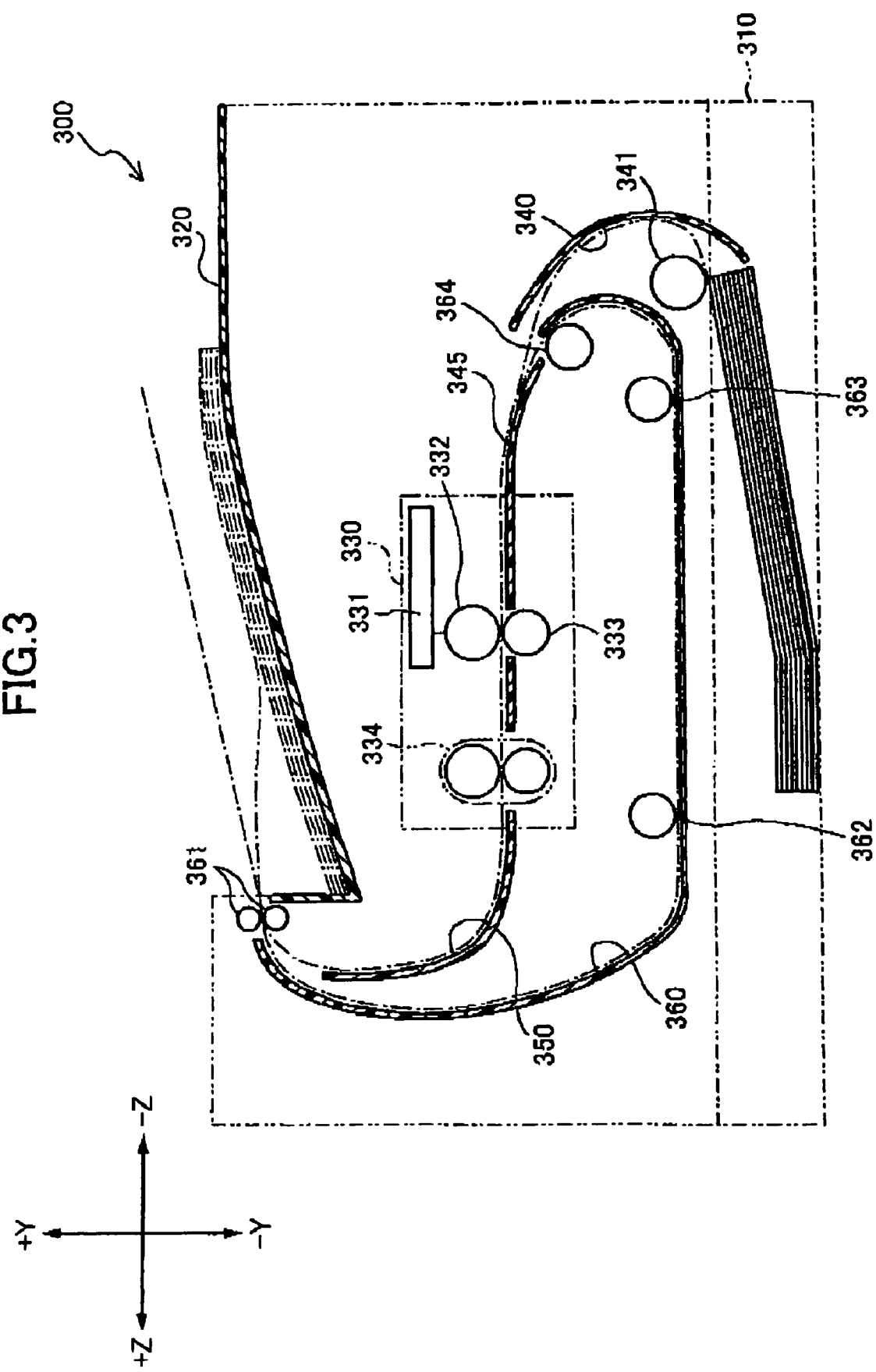
FIG. 3 illustrates a cross-section of an essential part of an image forming portion in the copy machine of FIG. 1, taken along the broken line B-B' in FIG. 1.

As shown in FIG. 3, at substantially the center of the image forming portion 300 is provided a print portion 330. The print portion 330 forms a toner image by a known laser recording method on a paper that is being fed from the front-surface side (−Z side) of the copy machine 100 to the rear-surface side (+Z side) of the copy machine 100. An S-shaped feed path is provided so that the paper is guided from the paper supply cassette 310 in the bottom portion, through the print portion 330, and into the paper discharge tray 320 in the upper portion.

The S-shaped transfer path is made from a feed path 340, a feed path 345, and a feed path 350. A paper supply roller 341 is provided above the front-surface side portion of the paper supply cassette 310. The feed path 340 is in the shape of a half-arc. The feed path 340 receives a sheet of paper that is sent toward the front-surface side of the copy machine 100 by the paper supply roller 341, and causes the sheet of paper to make a U-turn. The feed path 345 continues on from the feed path 340 to guide the paper into the print portion 330. The feed path 350 is in the shape of another half-arc. The feed path 350 causes the paper that has had an image formed thereon to make another U-turn, and guides the paper onto the paper discharge tray 320.

Paper discharge rollers 361 are provided at the trailing end of the feed path 350 in the direction in which the paper travels, and for discharging the paper onto the paper discharge tray 320.

A laser beam generator 331, a photosensitive drum 332, a transfer roller 333, and a fixing unit 334 are provided in the print portion 330.

The laser beam generator 331 generates a laser beam based on image data, and scans the laser beam over the surface of the photosensitive drum 332.

The photosensitive drum 332 rotates while the surface thereof is being charged uniformly by a charger (not shown). The potential at portions (bright portions) that are irradiated by the laser beam scanned by the laser beam generator 331 decreases with respect to the non-irradiated portions (dark portions). As a result, an electrostatic latent image is formed on the surface of the photosensitive drum 332 according to the thus created potential difference. A toner image is formed on the surface of the photosensitive drum 332 when toner supplied by a developer (not shown) is selectively attracted electrostatically to the bright portions on the surface of the photosensitive drum 332. The transfer roller 333 faces the surface of the photosensitive drum 332 with the paper being sandwiched between the transfer roller 333 and the photosenstivie drum 332. The toner image is electrostatically transferred onto the upper surface of the paper when the paper passes through between the transfer roller 333 and the photosenstivie drum 332. The fixing unit 334 applies heat and pressure to the paper to which the toner image has been transferred, to fix the toner on to the paper.

The image forming portion 300 is further provided with a double-sided print mechanism for printing on both sides of the paper. A feed path 360 is provided for turning the printed sheet of paper over and guiding the sheet of paper into the print portion 330 in such a manner that the sheet of paper which has been printed on one side can be printed on the other side as well. The feed path 360 is provided on the outer side (left side in FIG. 3) of the half-arc-shaped feed path 350. The paper is fed along the feed path 360 downward from the paper discharge rollers 361, past a position between the print portion 330 and the paper supply cassette 310, and is guided finally to the feed path 345. Paper that has been printed on one side is temporarily discharged on the paper discharge tray 320, at which time the trailing edge of the paper in the feed direction is separated from the feed path 350, but the paper discharge rollers 361 continue holding the paper therebetween. The rotation of the paper delivery rollers 361 is then reversed, as a result of which the paper is fed in the opposite direction. At this time, the leading edge of the paper, which has been the trailing edge of the paper while the paper has been transferred along the feed path 350, is guided into the feed path 360. Feed rollers 362, 363, and 364 are provided along the feed path 360. When the paper arrives at the feed path 345 after being transported by the feed rollers 362, 363, and 364, the surface already formed with images face downwardly but the surface formed with no images face upwardly. Thus, front and back surfaces of the paper are reversed while the paper is transferred along the feed paths 360 and 345.

As shown in FIG. 1, the operating portion 400 is an input/output portion in the form of a panel, and extends in the right-and-left (lateral) direction (X-axis direction). The operating portion 400 is provided with a plurality of switches and buttons that the operator uses for operating the copy machine 100. A copy button 410 is a button used when the operator instructs the copy machine 100 to start copying documents. When the copy button 410 is pressed by the user, the operating portion 400 transfers the user's instruction to the copy machine 100.

A display portion 420 formed of a liquid-crystal display or the like is provided at a position on the operating portion 400 that is slightly to the left of the center of the operating portion 400. The display portion 420 is for displaying messages such as errors and instructions to the operator.

Next, the electrical configuration of the copy machine 100 will be described with reference to FIGS. 4 and 5.

Figure 4:
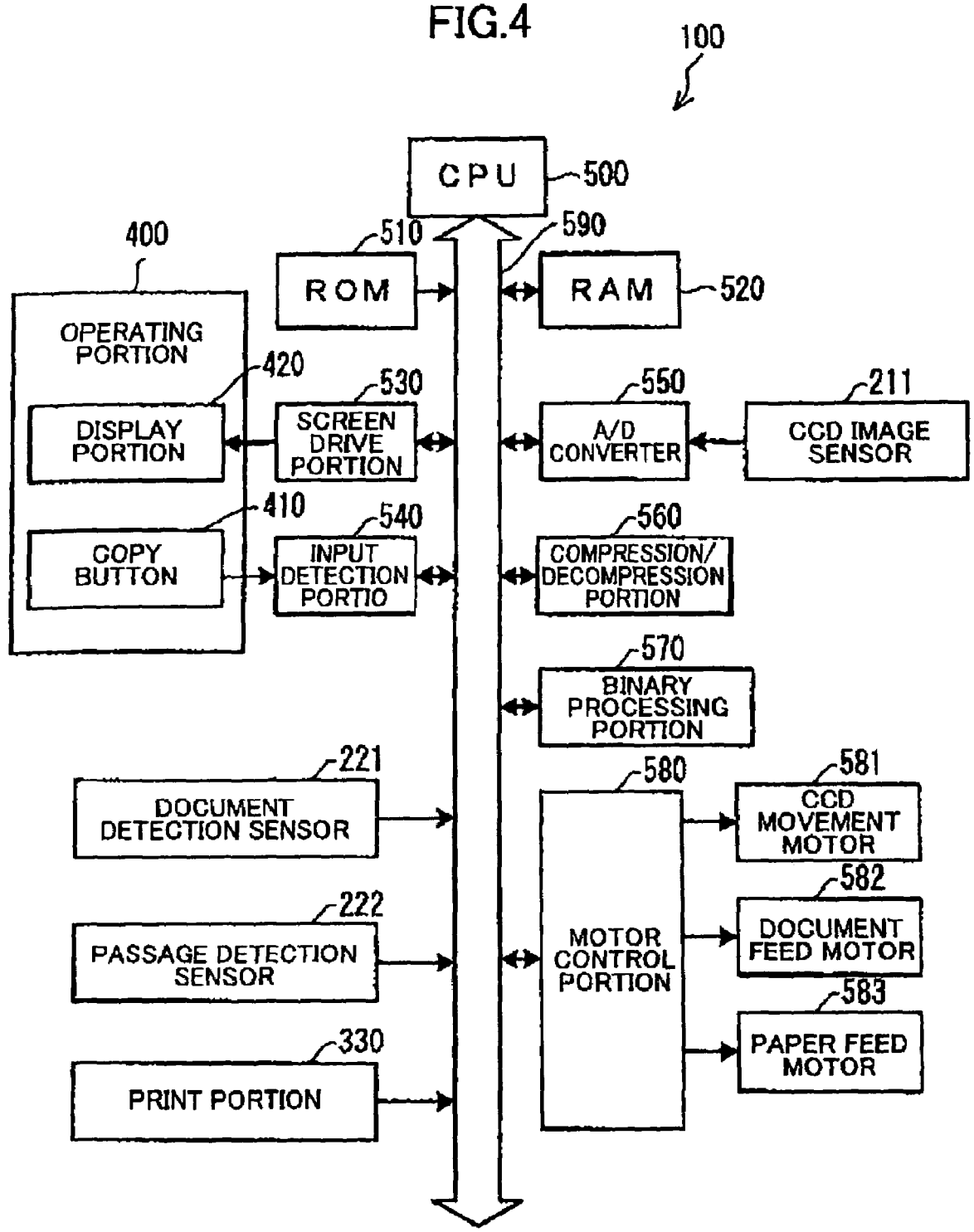
FIG. 4 is a block diagram of an electrical configuration of the copy machine of FIG. 1.

As shown in FIG. 4, a CPU 500, a ROM 510, a RAM 520, a screen drive portion 530, an input detection portion 540, the document detection sensor 221, the passage detection sensor 222, the print portion 330, the A/D converter 550, a compression/decompression portion 560, a binary processing portion 570, and a motor control portion 580 are connected to a bus 590 in the copy machine 100.

The CPU 500 is for controlling the copy machine 100.

The ROM 510 is prestored with various programs to be executed by the CPU 500, various settings, and various initial values. The programs include: a copy program that will be described later with reference to FIGS. 8 and 9, and a print program that will be described later with reference to FIG. 10.

The RAM 520 is for temporarily storing data while the is CPU 500 executes data processing.

The screen drive portion 530 is for controlling the display portion 420, which is connected to the screen drive portion 530, to display data such as characters and images.

The input detection portion 540 is for detecting the input of the copy button 410. Other several switches and buttons, which are provided on the operating portion 400 although not shown, are also connected to the input detection portion 540.

The A/D converter 550 is for converting the images that have been read in by the CCD image sensor 211 from the documents into digital data to be used as image data.

The binary processing portion 570 is for turning tone information of the image data (multi-value data on the brightness of each pixel) into binary data by converting the tone data into one-bit data by using a threshold value.

The compression/decompression portion 560 is for performing compression (encoding) to reduce the amount of binary image data and for performing decompression (decoding) to return the compressed image data to the original, decompressed image data.

The motor control portion 580 is for controlling various components including: a CCD movement motor 581 for moving the CCD image sensor 211 in order to read in a document placed on the glass plate 212 (FIG. 2); a document feed motor 582 for driving the supply roller 214, the pressure roller 215, and the discharge roller 216 in the ADF 210, as well as other document feed rollers (not shown); and a paper feed motor 583 for driving the paper supply roller 341, the paper discharge rollers 361, and the feed rollers 362, 363, and 364, as well as other paper feed rollers (not shown). The motor control portion 580 is further connected to other drive motors (not shown) for driving other drive components, such as the photosensitive drum 332 and the fixing unit 334 in the print portion 330.

The storage area of the RAM 520 will be described with reference to FIG. 5.

Figure 5:
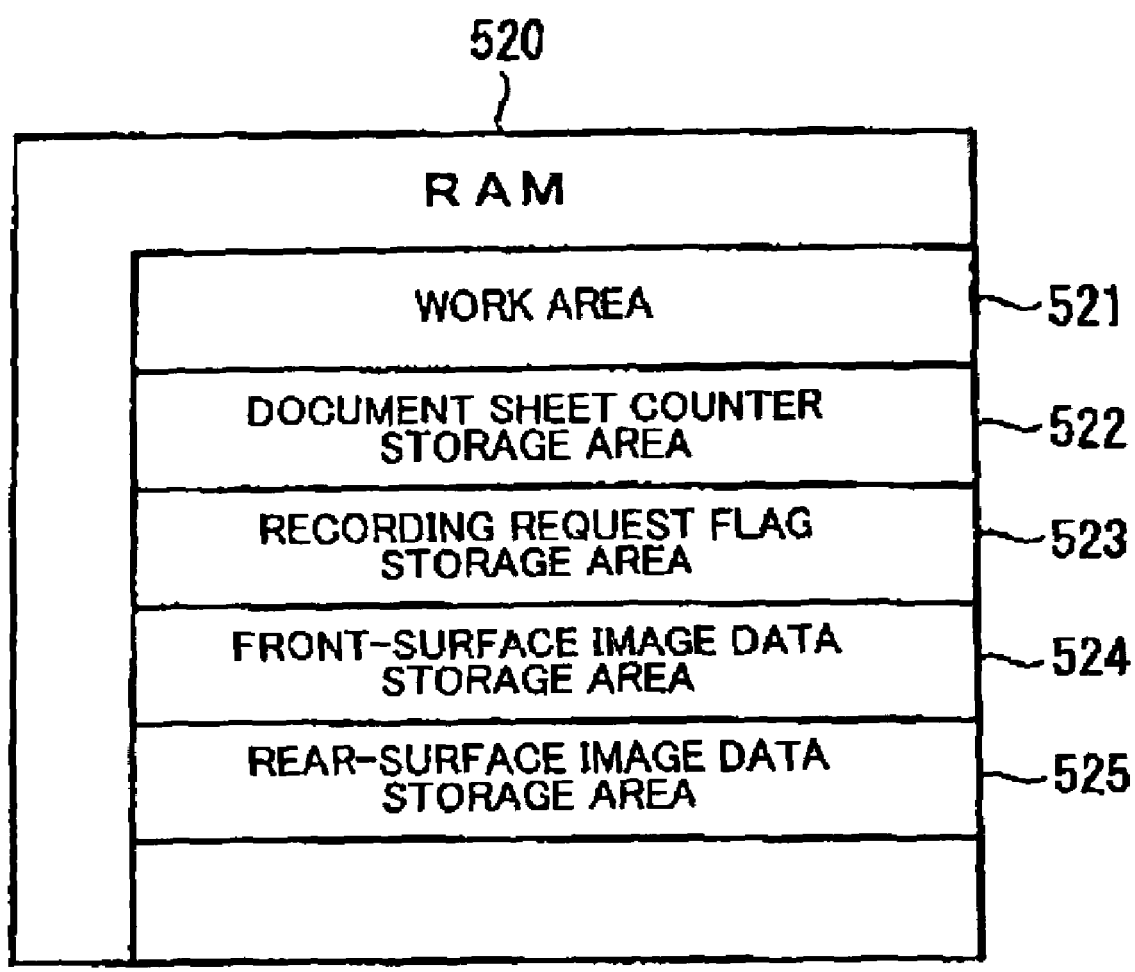
FIG. 5 illustrates several storage areas allocated in a RAM in FIG. 4.

As shown in FIG. 5, the RAM 520 is provided with: a work area 521 used for data processing; a document sheet counter storage area 522 in which are stored counters n and m for counting the numbers of documents read in; a recording request flag storage area 523 in which is stored a recording request flag for confirming whether or not a print command has already been sent to the image forming portion 300; a front-surface image data storage area 524 for storing image data for the front surfaces of the documents; and a rear-surface image data storage area 525 for storing image data for the rear surfaces of the documents.

Although not shown in the figure, the RAM 520 is also provided with storage areas used by the CPU 500 when the CPU 500 executes the print program for printing and executes other data processes.

Incidentally, the relationship between the front surface and the rear surface of a document is relative with respect to each other, but for the sake of simplicity the side of the document that is read in first by the image reading portion 200 during a document-reading stage (which will be described later) is assumed to be the front-surface of the document hereinafter.

The storage area of the RAM 520 is essentially divided into two sections or blocks. The first section is formed with the rear-surface image data storage area 525, while the second section is formed with all of the other remaining storage areas 521, 522, 523, and 524. More specifically, the storage areas 521, 522, and 523 are reserved or secured in the second section with a remaining available area being allocated to the front-surface image data storage area 524. Because the RAM 520 is thus partitioned into the two blocks, it is unnecessary to manage pointers for specifying the storage locations of image data that has been stored in each storage area 524, 525. It is therefore possible to efficiently access the storage location of image data when writing the image data in and reading image data out from the storage area 524, 525.

The front-surface image data storage area 524 and the rear-surface image data storage area 525 are provided independently from each other in this manner. Image data is stored so as not to span the two storage areas 524 and 525. The front-surface image data storage area 524 is for storing data for the front-surface sides of the documents and has a variable storage capacity. The rear-surface image data storage area 525 is for storing data for the rear-surface sides of the documents and has a fixed storage capacity.

The rear-surface image data storage area 525 has a storage capacity of image data that is to be read in from an image formed on one side (one surface) of one document. It is now assumed that the specifications of the copy machine 100 are such that the copy machine 100 can copy documents up to a maximum size of 8 inch by 10 inch, that one (1) bit of data quantity is required for each pixel, and that the copy machine 100 copies images at a resolution of 600×600 dpi. In this case, the amount of data read in from the maximum sized document is (8×600)×(10×600)×1=28,800,000 bits. A storage capacity of approximately 3.4 Megabytes is therefore required to store image data for one side of one document of the maximum size. In such a case, the storage capacity of the rear-surface image data storage area 525 is set to 3.4 Megabytes.

In contrast thereto, the storage capacity of the front-surface image data storage area 524 is preferably larger than the storage capacity of the rear-surface image data storage area 525. In order to copy a plurality of documents while reducing the work of the operator, the copy machine 100 first reads in the images on the front sides of all the documents in succession, and reads in the images on the rear sides of the documents after image data for the front sides of all the documents has been stored in the RAM 520, as will be described later. For that reason, as the storage capacity of the front-surface image data storage area 524 becomes larger, the quantity of image data that can be stored together in the front-surface image data storage area 524 increases, and the number of documents that can be processed also increases.

The copy machine 100 can compress image data, before storing the image data in the front-surface image data storage area 524 or the rear-surface image data storage area 525. In such a case, the storage capacity of the rear-surface image data storage area 525 is set dependently on the compression ratio, at which the copy machine 100 compresses the image data.

It is now assumed that a compression engine employed by the compression/decompression portion 560 compresses image data from the rear surface of one document at a compression ratio of between 50% and 70%. In such a case, the storage capacity of the rear-surface image data storage area 525 can be decreased to a value of 70% of the original storage capacity (3.4 Megabytes in the above-described example). Similarly, when the image data from the front surfaces of the documents is compressed before being stored in the front-surface image data storage area 524, it is possible to increase the original quantity of the image data that can be stored in the front-surface image data storage area 524. It is possible to increase the number of documents that can be processed at a time.

Next will be described with reference to FIGS. 6 and 7 how the copy machine 100 copies several (three, in this example) documents formed with images on both sides thereof. In this case, three documents are originally stacked as indicated by a state C in FIG. 6 and are placed on the supply tray 220.

The image on the front surface of the uppermost document sheet is denoted by I, the image on the rear surface thereof is denoted by II, the image on the front surface of the second document sheet is denoted by III, the image on the rear surface thereof is denoted by IV, and the image on the front surface of the third (lowermost) document sheet is denoted by V, and the image on the rear surface thereof is denoted by VI.

On each surface of each document, an arrow indicates a direction from the bottom toward the top of a corresponding image.

The image on the upper side of each document in the stack is indicated with a solid line, whereas the image on the under side thereof is indicated with a broken line.

In order to produce a copy product of the plurality of (three, in this example) documents with images formed on both sides thereof, all the images I, III, and V on the front surfaces of the documents are first read in sequentially by the image reading portion 200.

The reading of these documents starts being executed when the operator presses the copy button 410 after locating the document stack on the supply tray 220 as shown in the state C. The images on the front surfaces of the documents are read in by the document detection sensor 221 as the documents are fed through one at a time by the ADF 210.

More specifically, the uppermost document (first (n=1) document) in the stack on the supply tray 220 is fed through in a state in which the front surface (the surface with image I) faces the curved surface of the feed path 213 shown in FIG. 2. The front surface confronts the CCD image sensor 211 via the glass plate 212, and the image I on the front surface is read in line by line. After passing the CCD image sensor 211, the document is discharged on the discharge tray 230 with its front surface with image I facing downwardly as in the state of D.

Subsequently, the images III and V on the front surfaces of the remaining documents are read in in the sequence in which the documents are stacked, in a similar manner as described above, and are discharged on top of the previous document to produce a stack of documents as in the state D. More specifically, the image III on the front surface of the second (n=2) document is read in, and is discharged on top of the first (n=1) document. Next, the image V on the front surface of the third or lowermost (n=3) document is read in, and is discharged on top of the second (n=2) document. In this manner, image data of the images I, III, and V on the front surfaces of the first through third (n=1 through 3) documents is stored in the front-surface image data storage area 524 in the RAM 520 in the sequence in which the image data has been read in from the corresponding documents.

Viewing an instruction displayed on the display portion 420, the operator sets the documents that are now stacked on the discharge tray 230 as in state D back onto the supply tray 220 as in state E while maintaining unchanged the orientation and the stacking direction of the documents. As a result, the documents are set on the supply tray 220 in the state E. In state E, the documents are stacked in the opposite stacking order from the state C. More specifically, the document with image I, which has been located uppermost in state C, is now located in the lowermost in state E, while the document with image V, which has been located lowermost in state C, is now located in the uppermost in state E. In state E, the front surfaces of the documents, on which the images I, III, and V are formed, face downwardly contrary to the state C in which the front surfaces of the documents have faced upwardly. In other words, in state E, the rear surfaces of the documents, on which the images II, IV, and VI are formed, face upwardly contrary to the state C in which the rear surfaces of the documents have faced downwardly. The bottom-to-top direction in state E is opposite to the bottom-to-top direction in state C.

The operator then presses the copy button 410 to instruct the copy machine 100 to start the reading of the rear surfaces of the documents in sequence from the top in the stack order, in the same manner as the front surfaces. As a result, the images VI, IV, and II are read in in this order. The documents are then sent out onto the discharge tray 230 as in state F.

More specifically, the image VI on the rear surface of the first (m=1) or uppermost document (state E), which is the same as the third (n=3) document (state C), is read in, and is discharged on the discharge tray 230. Then, the image IV on the rear surface of the second (m=2) document in state E, which is the same as the second (n=2) document in state C, is read in, and is discharged on top of the first (m=1) document. Next, the image II on the rear surface of the third or lowermost (m=3) document, which is the same as the first (n=1) document in state C, is read in, and is discharged on top of the second (m=2) document.

According to the copy machine 100, the printing of a copy product of each document is executed simultaneously when the rear surface of the subject document is being read in. The printing is started in response to a print start command (hereinafter called a "recording request") that is outputted from the copy program that will be described later with reference to FIGS. 8 and 9. The copy program manages the timing at which the recording request is outputted in such a manner that images based on image data for the front side and the rear side of each document are formed by the print portion 330 simultaneously when the image data for the rear surface of the subject document is being stored into the rear-surface image data storage area 525. In other words, printing for the front and rear surfaces of each document is executed in parallel with the storing of image data for the rear surface of the subject document.

Image data that has already been printed is no longer necessary. Accordingly, when image data for the rear surface of one document is newly read in, the rear-surface image data storage area 525 that is now stored with already-printed image data for the rear surface of a previous document is overwritten by the image data for the present document. Once the copying based on the present document has ended, the storage area 525 is again overwritten by the image data for the rear surface of the next document that is newly read in.

Thus, in contrast to other types of copy machine in which printing starts only after images have been read from the front surfaces and rear surfaces of all the documents, the copy machine 100 of the present embodiment releases the storage area, which is occupied with image data that has already been printed, and stores image data for the next document in the released, now available area. The rear-surface image data storage area 525 does not need storage capacity for holding image data for the rear surfaces of all the documents. It is sufficient that the storage area 525 has a storage capacity for holding image data for the rear surface of a single document.

The image forming portion 300 is provided with the double-sided print mechanism and is capable of printing image data for both sides of each document onto both sides of a sheet of paper in response to a corresponding recording request.

Figure 6:
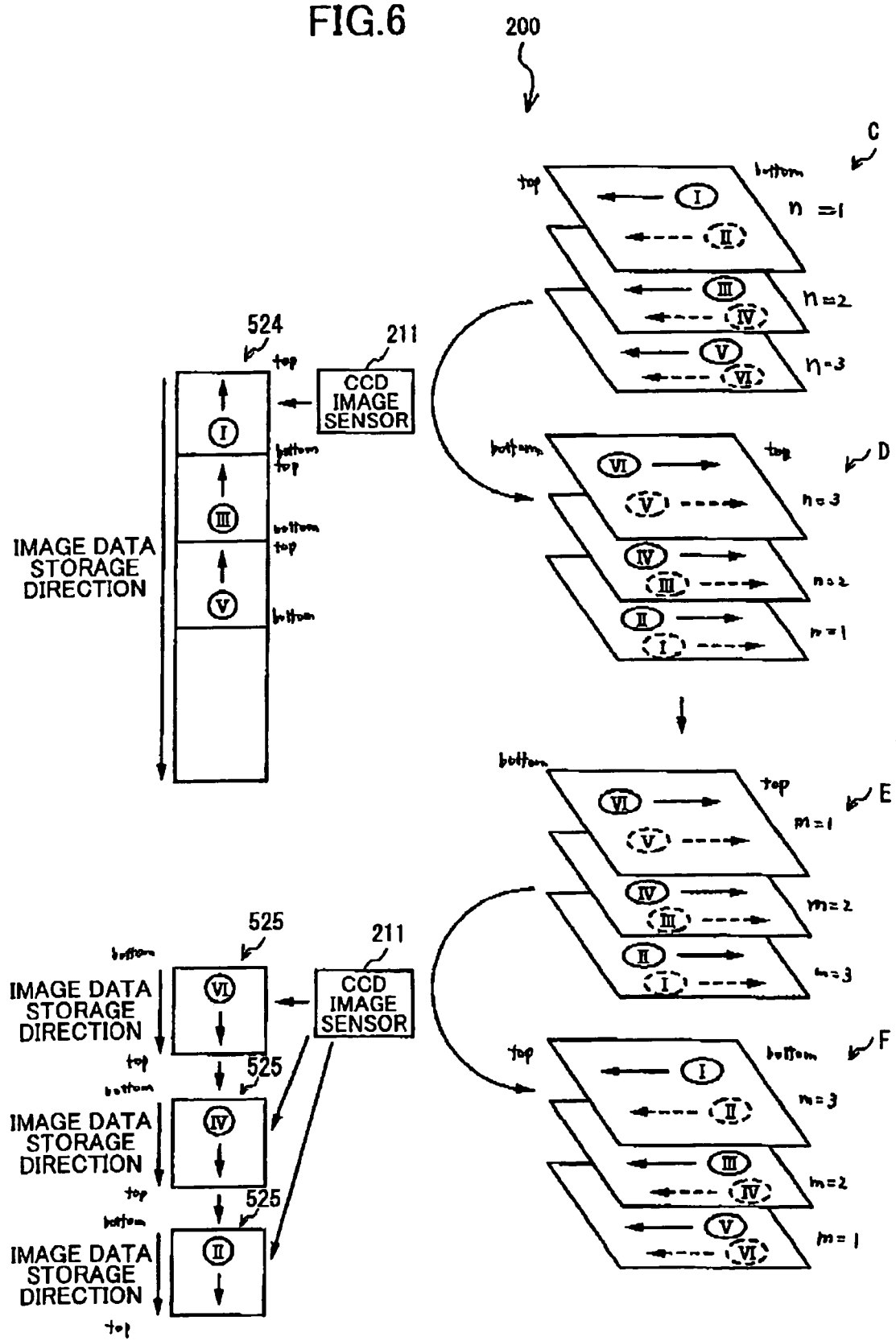
FIG. 6 is a schematic view in a document read-in process and showing a relationship among: the stacking direction of the documents, bottom-to-top directions of images on the documents defining the orientations of the documents, and the storage directions, in which image data of the read-in documents are stored in storage areas.
Figure 7:
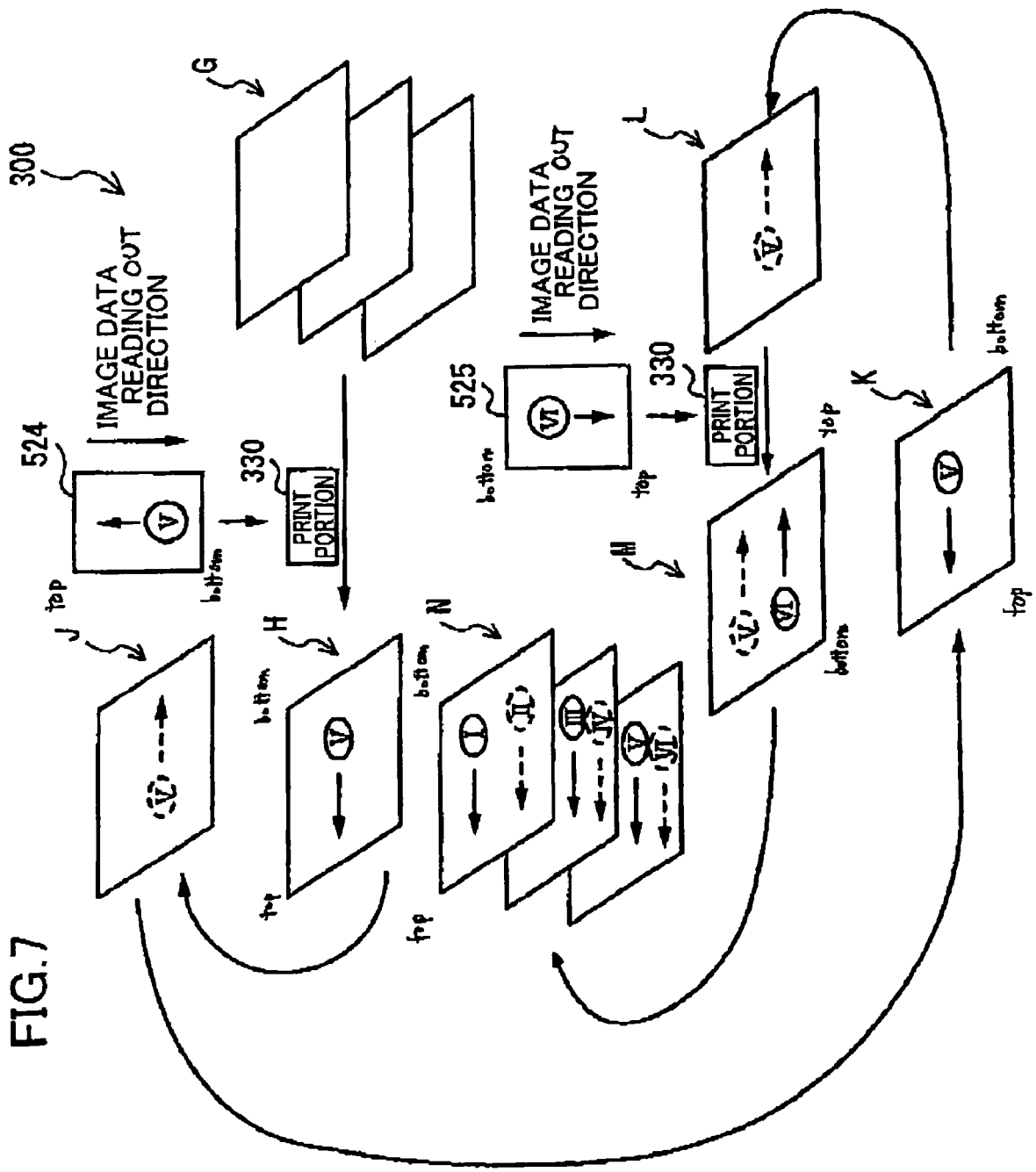
FIG. 7 is a schematic view in an image print process and showing a relationship among: the direction in which image data is read out from the storage areas; bottom-to-top directions of images printed on sheets of paper defining by the orientations of the sheets of paper; and the stacking direction of the printed sheets of paper on the discharge tray.

The image forming portion 300 starts printing, as shown in FIG. 7, when a recording request is issued while the image VI is being read in from the rear surface of the first (m=1) or uppermost document in state E (third (n=3) or lowermost document in state C) of FIG. 6. It is noted that image data for image VI, which is now being read in from the rear surface of the first (m=1) document in state E and which is now being stored in the storage area 525, is linked with image data for image V, which has already been read in from the front surface of the third (n=3) document in state C and which is stored in the storage area 524.

One of papers stacked in the paper supply cassette 310 (state G) is fed to the print portion 330 by the paper supply roller 341 and along the feed paths 340 and 345. In the print portion 330, a front surface of the sheet of paper that now faces the photosensitive body 332 is printed with an image (image V at state H), and is sent out along the feed path 350 by the paper discharge rollers 361 onto the paper discharge tray 320 (state J).

When the trailing edge of the paper reaches the position of the paper discharge rollers 361, the paper discharge rollers 361 starts rotating in the opposite direction, pulling the paper back into the image forming portion 300. The trailing edge (now, leading edge) of the paper is guided toward the feed path 360, which is provided at a different position from the feed path 350, and is again guided along the feed path 360 (state K) to the print portion 330 (state L). The passage along the feed path 360 turns the paper so that the rear surface of the paper that is opposite to the front surface on which the image V has been formed faces the photosensitive body 332. Another image (image VI) is then formed by the print portion 330 on the rear surface (state M), and the paper is sent out to the paper discharge tray 320 by the paper discharge rollers 361 along the feed path 350 (state N). As a result, a copy product formed with image V on the front surface and image VI on the rear surface is produced, and is discharged on the discharge tray 320 with the front surface facing upwardly.

Next, the image forming portion 300 starts printing when a recording request is issued while the image IV is being read in from the rear surface of the second (m=2) document in state E (second (n=2) document in state C). It is noted that image data for image IV, which is now being read in from the rear surface of the second (m=1) document in state E and which is now being stored in the storage area 525, is linked with image data for image III, which has already been read in from the front surface of the second (n=2) document in state C and which is stored in the storage area 524. A copy product formed with image III on the front surface and image IV on the rear surface is produced, and is discharged with the front surface facing upwardly. The copy product is stacked on top of the already-produced copy product that is formed with image V on the front surface and image VI on the rear surface.

Next, the image forming portion 300 starts printing when a recording request is issued while the image II is being read in from the rear surface of the third (m=3) or lowermost document in state E (first (n=1) or uppermost document in state C). It is noted that image data for image II, which is now being read in from the rear surface of the third (m=3) document in state E and which is now being stored in the storage area 525, is linked with image data for image I, which has already been read in from the front surface of the first (n=1) document in state C and which is stored in the storage area 524. A copy product formed with image I on the front surface and image II on the rear surface is produced, and is discharged with the front surface facing upwardly. The copy product is stacked on top of the already-produced copy product that is formed with image III on the front surface and image IV on the rear surface.

As a result, the copy documents are stacked on the discharge tray 320 in state N in the same order as the original documents on the supply tray 220 in state C (FIG. 6). The bottom-to-top direction on each copy document is oriented in the same direction with the bottom-to-top direction on the corresponding original document. The front surface of each copy document faces upwardly in the same manner as the front surface of the corresponding original document.

It is noted that image data from the rear surface of each document (m-th document) is linked with image data from the front surface of the n-th document, wherein n satisfies the relationship of $n=\{(Nmax+1)-m\}$, wherein Nmax is the maximum of the m. In this example, Nmax=3.

According to the present embodiment, image data from the front surface of each $(n(=(Nmax+1)-m))$-th document is printed prior to the image data from the rear surface of the same (m-th) document. Accordingly, even though the printed sheets are turned over from state M to the final state N as shown in FIG. 7, the printed sheets in the final state N is properly in a face up state in the same manner as the face up state of the original documents in state C of FIG. 6.

According to the copy machine 100 of the present embodiment, image data read-in from the documents can be compressed before being stored in the storage area 524 or 525.

It is noted that whether or not image data is compressed depends on the relationship between the storage direction, in which the image data of the documents read in by the image reading portion 200 is stored in the RAM 520 (FIG. 6), and the read-out direction, in which the image data is read out from the RAM 520 to be printed by the print portion 330 (FIG. 7).

Taking the image V on the third document in state C of FIG. 6 as an example, the image is read line-by-line from the top to the bottom (hereinafter called the "normal direction") and is stored in the front-surface image data storage area 524 in the sequence the same as the sequence in which the respective lines have been read in the normal direction. Because the stored image data for this image V is read out for printing from the storage area 524 line-by-line (see FIG. 7) in the sequence the same as the sequence in which the image data has been stored in the storage area 524, the image data can be decompressed easily even if the image data has been stored in the RM 520 after being compressed. This is because the image data can be easily decompressed when the image data is decompressed in the same direction as the direction in which the image data has been compressed.

Taking the image VI on the third document in state C as another example, the image is read line-by-line from the bottom to the top (hereinafter called the "reverse direction") and is stored in the rear-surface image data storage area 525 in the sequence the same as the sequence in which the respective lines have been read in the reverse direction. Because the stored image data for this image VI is read out for printing from the storage area 525 line-by-line (see FIG. 7) in the sequence the same as the sequence in which the image data has been stored in the storage area 525, the image data can be decompressed easily even if the image data has been stored in the RAM 520 after being compressed.

It is noted that if the reading out of the image data in the image V were executed in an opposite order from the direction in which the lines of image V have been stored, the image data may not be decompressed easily. It becomes necessary to provide an additional storage area for performing the decompression. This requires a larger storage capacity.

In the copy machine 100 of the present embodiment, the storing direction (FIG. 6) and the read out direction (FIG. 7) are the same with each other for the image data for the front surfaces of the documents. Similarly, the storing direction (FIG. 6) and the read out direction (FIG. 7) are the same with each other also for the image data for the rear surfaces of the documents. It is therefore possible to compress the image data for both of the front surfaces and the rear surfaces.

In this way, in order to copy a plurality of documents hating images formed on both sides, the images on the front surfaces of all the documents are read in first, and then the rear surfaces of the documents are read in. The CPU 500 executes the copy program (see FIGS. 8 and 9) to manage storing of image data into and read out of image data from the storage area 525. The CPU 500 can therefore execute copying operation regardless of the storage area 525 with a small storage capacity and can shorten the period of time required to complete the copying process. According to the copy program, the CPU 500 manages also the sequence in which image data is printed so that the operator will obtain copies that are stacked in the same order as the original documents.

Figure 8:
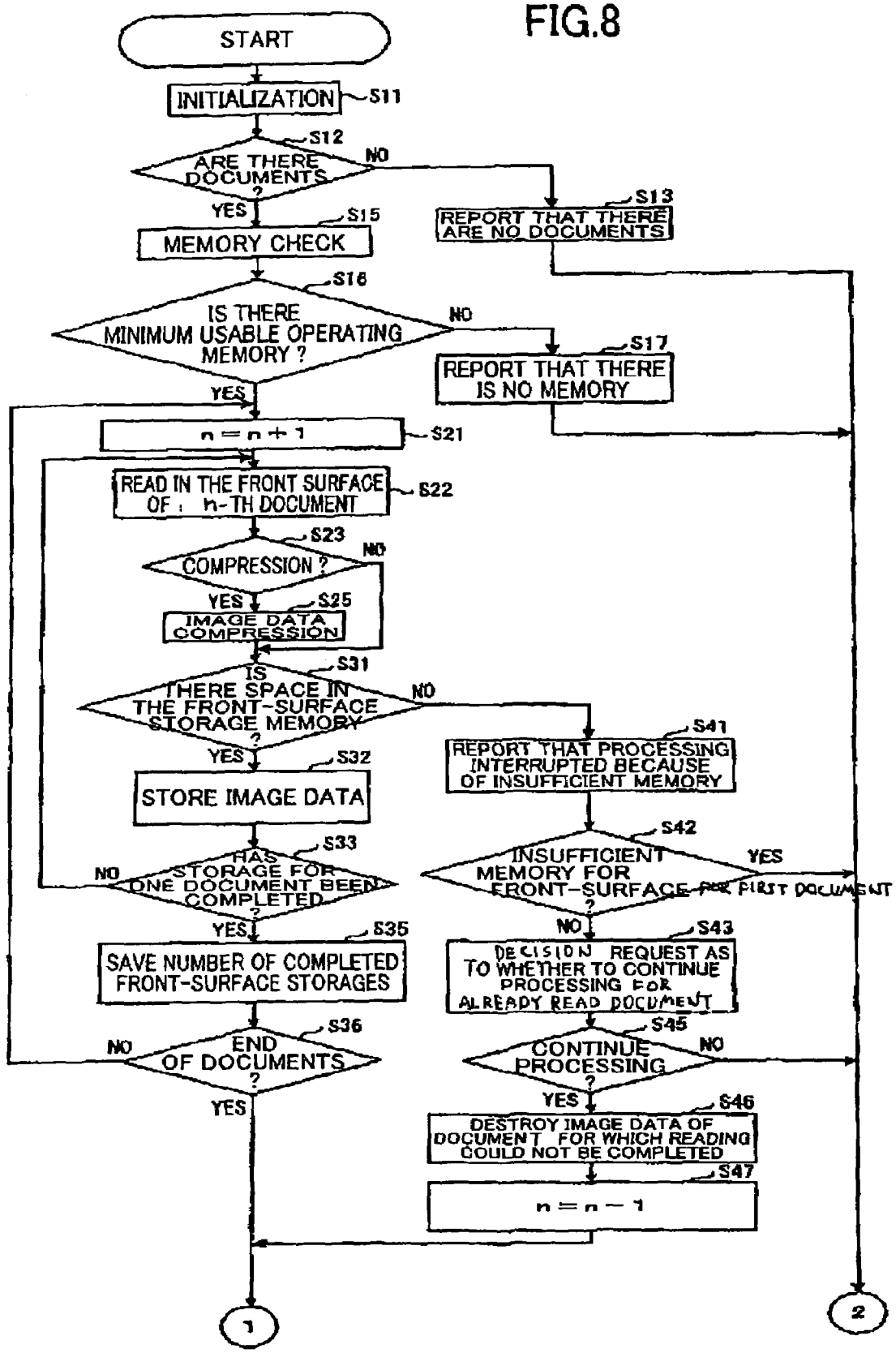
FIG. 8 is a flowchart of a part of a copy program for implementing double-sided copying.
Figure 9:
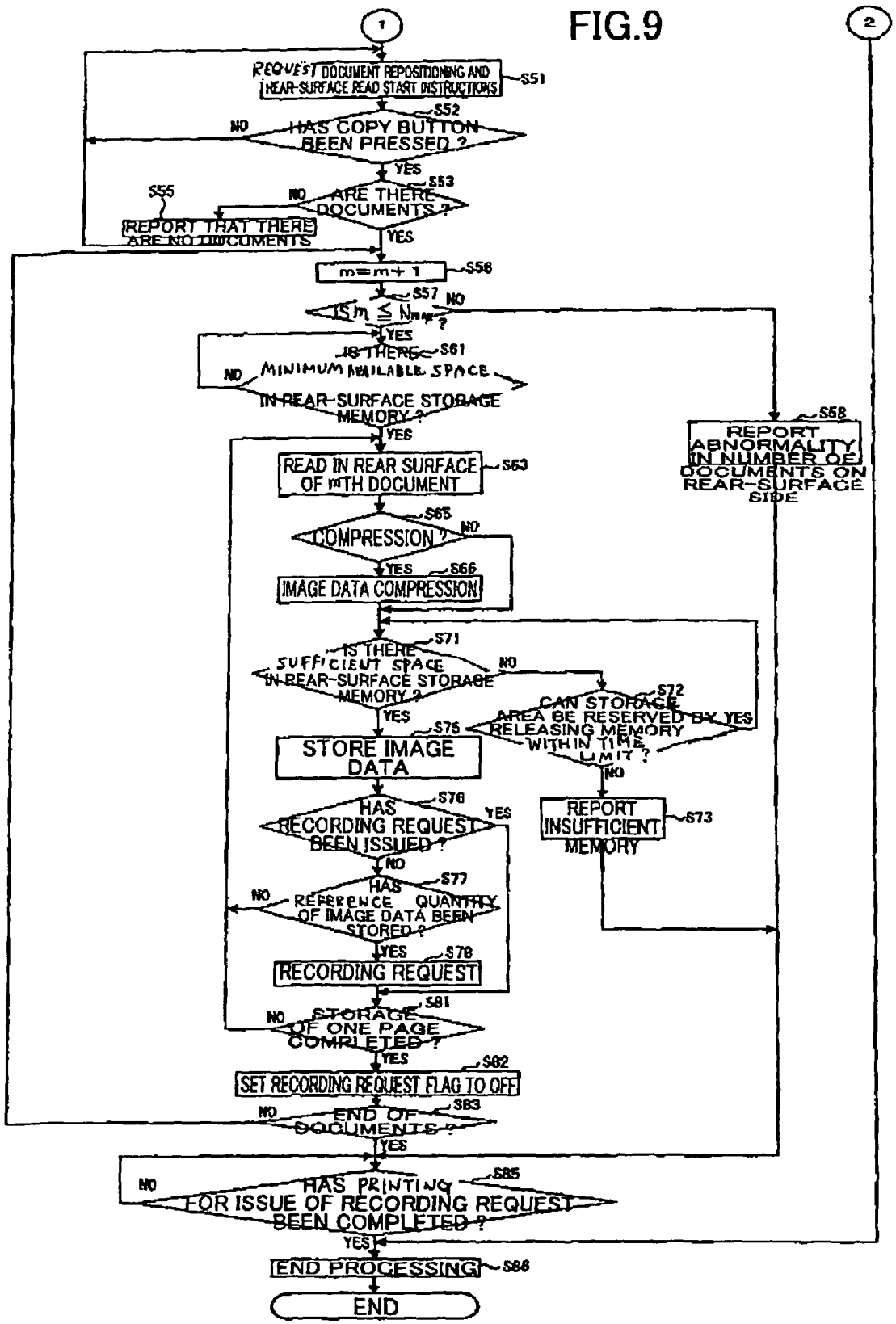
FIG. 9 is a flowchart of a remaining part of the copy program.
Figure 10:
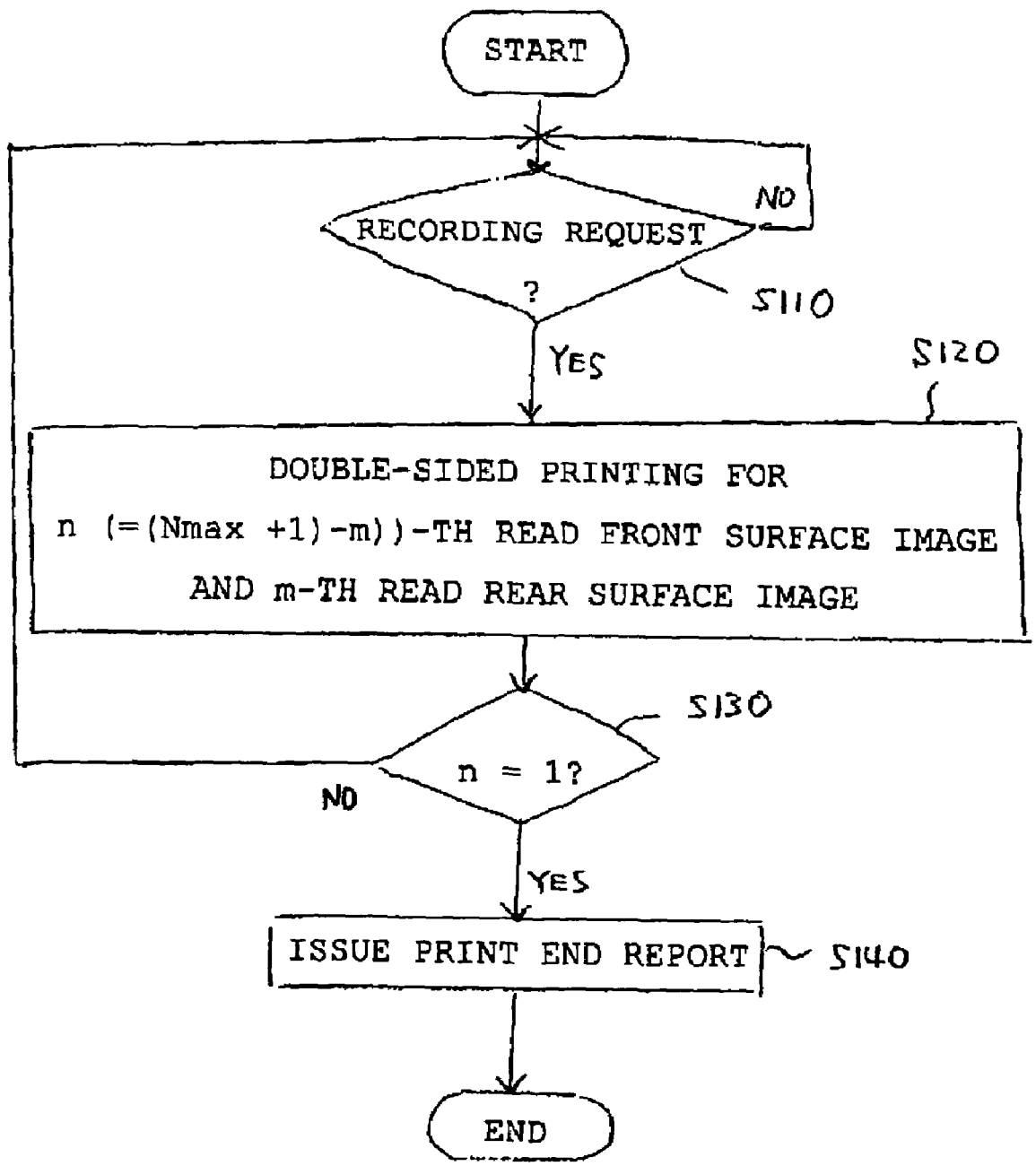
FIG. 10 is a flowchart of a print program for implementing double-sided copying.

FIGS. 8 and 9 show the copy process for managing image data to obtain a copy of documents. FIG. 10 shows the print process to obtain the copy of documents.

It is noted that the copy program of FIGS. 8 and 9 and the print program of FIG. 10 are prestored in a predetermined storage area of the ROM 510. The CPU 500 executes the copy program and the print program when the operator selects the mode for double-sided copying.

The copy program is installed not only in the copy machine 100 but also in: other types of copy machines and multifunction devices that read in both sides of documents and print the read-in images onto both sides of papers to produce a copy of the documents; and other devices that read in both sides of documents and output files, in formats such as PDF, that can be used by electronic computers. Accordingly, various settings are stored in a predetermined storage area of the ROM 510. According to the settings, the specification of an image processing manner employed by the copy program is customized to match the unique configuration of the device, in which the copy program is installed.

These settings include: data indicative of whether or not to compress read-in image data before storing the image data; print sequence data that is indicative of whether or not image data from the front surface of one (n(=(Nmax+1)−m))-th) document should be printed prior to the image data from the rear surface of the same (m-th) document: a rear storage capacity (rear surface available area minimum amount) that has to be allocated for the rear-surface image data storage area 525; a front storage capacity (front surface available area minimum amount) that has to be allocated for the front-surface image data storage area 524 in the RAM 520 and that is greater than the rear storage capacity: and a predetermined reference image data quantity "Q1b–Q1" as will be described later. These settings will be referred to as a "machine-specific settings" hereinafter.

Data indicative of whether or not to compress image data is dependent on the storing direction and the read-out direction of image data into and from the storage areas 524 and 525. For the copy machine 100, this data normally indicates to compress image data because the storing direction of the image data matches the read-out direction thereof.

When the copy program of FIGS. 8-9 is installed in other multifunction devices or other copy machines, the unique configurations of those devices will possibly require that the storing direction of the image data does not match the read-out direction thereof, Accordingly, the machine-specific setting enables selection of whether or not image data is to be compressed.

It is noted that even in the copy machine 100, the operator can select another mode, in which the direction (orientation) in which an image is printed on the front surface of a recording medium is different from the direction (orientation) in which an image is printed on the rear surface of the recording medium. When this selection is made, it becomes necessary to differentiate the read out direction from the storing direction. In this case, the setting indicates not to execute compression.

The print sequence data is determined dependently on the specifications of the image forming portion 300 of a device, in which the copy program of FIGS. 8-9 is installed, that is, whether printed surfaces of printed sheets discharged by the image forming portion 300 face upwardly or downwardly. For the copy machine 100, the print sequence data indicates that image data from the front surface of one (n(=(Nmax+1)−m))-th) document should be printed prior to image data from the rear surface of the same (m-th) document.

For the copy machine 100, the rear storage capacity (rear surface available area minimum amount) is set equal to the amount of one page's worth of image data that is to be obtained from one page of a maximum size document among all the documents that will possibly be mounted on the supply tray 220. The amount of one page's worth of image data is equivalent to a product of a compression ratio (smaller than or equal to one (1) and greater than or equal to zero (0)) and the amount of all the sets of image data that are to be read in by the image reading portion 200 from one page of the maximum size document. The front storage capacity (front surface available area minimum amount) is set equal to a value greater than the rear storage capacity.

As mentioned above, the copy program can be installed not only in the copy machine 100 but also in other types of copy machines and multifunction devices. In some device, it is impossible to allocate a storage capacity equivalent to one page's worth of image data for the maximum size document to the rear-surface image data storage area 525. In such a device, a storage capacity smaller than one page's worth of image data is allocated for the rear-surface image data storage area 525. While an image of a document is being read in line one by one, image data for a newly-read-in line is stored in the rear-surface image data storage area 525 by being overwritten over image data that has already been printed. The storage area 525 with the small storage capacity is thus used highly efficiently.

In such a device, however, if the image read-in speed is faster than the print speed, image data that is stored in the rear-surface image data storage area 525 but that has not yet been printed by the image forming portion 300 will possibly be overwritten by newly-read-in image data. The not-yet-printed image data will be lost. The copy operation is performed improperly. For such devices, therefore, the rear storage capacity (rear surface available area minimum amount) is determined based on a difference between the print speed and the image read-in speed so that the rear-surface image data storage area 525 having an available area with the rear storage capacity can properly receive image data for newly-read-in line(s) without overwriting the image data onto not-yet-printed image data. Experiments are executed to determine the amount of the rear storage capacity, when is then set as one of the machine-specific settings for the subject device.

For such a device, the rear storage capacity (rear surface available area minimum amount) is set equal to an amount that is smaller than the amount of one page's worth of image data from the maximum size document but that is determined by previously executing the experiments. The front storage capacity is still set to a value greater than the amount of one page's worth of image data from the maximum size document.

The double-sided copying (copy program of FIGS. 8 and 9) is started when the operator stacks, on the supply tray 220, a plurality of document sheets (three document sheets shown in FIG. 6 in this example) formed with images on their both sides and then presses the copy button 410.

When the copy program is started being executed, first, as shown in FIG. 8, initialization is executed in S11.

The initialization includes: allocating the various storage areas 521-525 in the RAM 520 according to the machine-specific settings; setting to zero (0) the counters n and m in the document sheet counter storage area 522; and setting off the recording request flag in the recording request flag storage area 523.

Next, in 512, the document detection sensor 221 is controlled to check whether or not there are any documents on the supply tray 220.

If there are no documents on the supply tray 220 (NO in S12), a message is displayed on the display portion 420 to inform the operator that there are no documents on the supply tray 220 in S13. An end processing is then performed in S86 (FIG. 9), in which the storage areas secured in the RAM 520 for the copy program are released, and the copy program ends.

If the document detection sensor 221 detects some document on the supply tray 220 (YES in S12), the CPU 500 executes in S15 a memory check to check the storage capacity which has been allocated for the front-surface image data storage area 524 and the rear-surface image data storage area 525 during the initialization process of S11.

Then, the CPU 510 determines in S16 based on the result of the check in S15 whether or not the minimum usable operating memory is available for each of the front-surface image data storage area 524 and the rear-surface image data storage area 525. The CPU 510 executes this determination by determining whether or not the storage capacity allocated in the RAM 520 for the front-surface image data storage area 524 is greater than or equal to the front storage capacity that is stored in the ROM 510 as one of the machine-specific settings, and by determining whether or not the storage capacity allocated in the RAM 520 for the rear-surface image data storage area 525 is greater than or equal to the rear storage capacity that is stored in the ROM 510 as one of the machine-specific settings. In this example, the rear storage capacity is set to a value equal to the amount of one page's worth of image data to be read in from the maximum size document for the copy machine 100. The front storage capacity is set to a value greater than the rear storage capacity.

If the storage capacity of the front-surface image data storage area 524 is less than the front storage capacity or if the storage capacity of the rear-surface image data storage area 525 is less than the rear storage capacity (NO in S16), the CPU 500 determines that sufficient storage capacities have not been allocated in the RAM 520 for at least one of the storage areas 524 and 525 through the initialization processing of S11. Accordingly, in S17, a message or the like is displayed on the display portion 420 to inform the operator that there is no memory. Then, the end processing is executed in S86, and the copy program ends.

On the other hand, if the storage capacity of the front-surface image data storage area 524 is greater than or equal to the front storage capacity and if the storage capacity of the rear-surface image data storage area 525 is greater than or equal to the rear storage capacity (YES in 516), the CPU 500 determines that sufficient storage capacities are allocated in the RAM 520 for both of the storage areas 524 and 525. Accordingly, the CPU 500 increments the value of the counter n by one (1) in S21.

Then, the front-surfaces of the documents stacked on the supply tray 220 are read-in by the loop of S21 to S36. The counter n indicates that a n-th document from the top of the stack is now being read in. Because zero (0) has been set to the counter n during the initialization of S11, when the processing of S21 is first executed, the value of the counter n becomes one (1) and therefore indicates that the uppermost document is now being read in.

More specifically, in S22, the reading in of the front surface of the n-th document from the top of the stack starts (S22). The document is fed in and the image formed on the front surface of the n-th document (image I on the front surface of the first document in state C of FIG. 6) is read in one line at a time by the CCD image sensor 211. The image data that is outputted from the CCD image sensor 221 is converted into digital data by the A/D converter 550. The digital data is converted by the binary processing portion 570 into binary values, before being subjected to image processing, such as shading correction or character emphasis, although not shown in the drawings. If the binary-form image data is to be compressed as specified by the machine-specific setting (YES in S23), compression of the image data is executed by the compression/decompression portion 560 in S25. According to the present embodiment, the image data for the front surface of each document will be read out from the storage area 524 in the same line-by-line sequence as the line-by-line sequence in which the image data is stored in the storage area 524. Accordingly, the image data can be compressed if specified by the machine-specific setting. Then, the process proceeds to S31.

On the other hand, if compression is not to be executed (NO in S23), the flow proceeds directly to S31.

In S31, the CPU 500 checks whether or not there exists any available space in the front-surface image data storage area 524. If a large number of documents are placed on the supply tray 220, the amount of data from the documents will possibly exceed the storage capacity of the front-surface image data storage area 524. In such a case, as will be described later, print processing will be executed only for those image data that has been read in up to when the amount of data from the documents reaches the storage capacity of the front-surface image data storage area 524.

On the other hand, if there exists some available space in the front-surface image data storage area 524 (YES in S31), image data (compressed or non-compressed image data) for the read-in documents is stored in S32.

Thus, the image I is read in line-by-line in the direction from the top to the bottom of the image (hereinafter called the "normal direction"). The image data for the respective lines of the image I is stored in the front-surface image data storage area 524 in the sequence in which the lines have been read in in the normal direction.

While the storage of image data for one document that is presently being read in line-by-line is not yet complete (NO in S33), the flow returns to S22 and the reading of the present document continues. As described already, the leading and trailing edges of the document in the feed direction are detected by the passage detection sensor 222 as the document is being fed. In the determination processing of S33, the CPU 500 determines whether or not the storage of image data for one document has been completed by determining whether or not a predetermined period of time has passed after the trailing edge of the document has been detected by the passage detection sensor 222. The predetermined period of time is the total of: a period of time from when the trailing edge of the document passes the passage detection sensor 222 until the trailing edge of the document passes the CCD image sensor 211; and another period of time required to process image data of the document that has been read in by the CCD image sensor 211 and then to store the image data in the front-surface image data storage area 524. The predetermined period of time is determined previously by experiments.

While the reading in of the document is continuing in the loop of S22 to S33, if there exists no more available space in the front-surface image data storage area 524 (NO in S31), a message or the like is displayed on the display portion 420 in S41 to inform the operator that the processing is interrupted due to insufficient memory.

Next, in S42, the CPU 500 refers to the present value in the counter n. If the present value of the counter n is equal to one (1), it is known that the memory insufficiency has occurred during the reading in of the front surface of the first document (YES in S42). The CPU 500 therefore determines that the double-sided printing is impossible. The copy program ends after passing through the end processing of S86.

It is noted that the memory insufficiency will possibly occur while the front surface of the first document is being read in as described below. The memory insufficiency will possibly occur if the size (length, for example) of the first document is greater than the maximum size of documents assumed by the machine-specific setting for the copy machine 100. The memory insufficiency will possibly occur also if the document compression ratio, at which the compression/decompression portion 560 actually compresses image data, is lower than a compression ratio assumed by the machine-specific setting.

On the other hand, if the reading in of the front surface of the first document is completed without generating a memory insufficiency (YES in S33), the present value of n is stored in S35 in the front-surface image data storage area 524 together with the image data for the subject document that has just been read in and stored. In other words, the image data that has just been stored in the storage area 525 is linked with the number n that indicates the order of the document, from which the image data has been read in, from the top of the stack.

The CPU 500 then checks in S36 whether or not the reading of all the documents has been completed by controlling the document detection sensor 221 to check whether or not there remain any documents on the supply tray 220. If there still remain some document (NO in S36), the flow returns to S21, where the counter n is incremented by one (1), and the front surface of the next document is read in in the same manner as described above by the loop of S22 to S33. In the example shown in FIG. 6, the image III on the front surface of the second document in state C is read in, followed by the image V on the front surface of the third document.

On the other hand, if all of the documents stacked on the supply tray 220 have been read in and no documents remain on the supply tray 220 (YES in S36), the flow moves on to the processing of S51 in FIG. 9.

When a memory insufficiency occurs while the second or subsequent document is being read (NO in S31 and NO in S42), the display portion 420 is controlled in S43 to display a decision request to confirm whether the operator wishes to continue the double-sided copying of the documents that have already been read in. If the operator instructs the cancellation of the double-sided copying by operating a predetermined button on the operating portion 400 (NO in S45), the end processing is performed in S86, and the copy program ends without performing the double-sided copying.

On the other hand, if the operator manipulates the operating portion 400 to instruct the copy machine 100 to perform double-sided copying of the documents that have been read in so far (YES in S45), the image data for the n-th document, for which reading has not been completed, is cleared or destroyed in S46. In other words, image data in the front-surface image data storage area 524 that has not yet been linked to a value of the counter n by the processing of S35 is destroyed. Next, in S47, the CPU 500 decrements the value of the counter n by one (1), and the flow proceeds to S51 of FIG. 9.

When the reading of the front surfaces of the documents has been completed (yes in S36 or yes in S45, S46, S47), the display portion 420 is controlled in S51 to display a report asking the operator to reposition the documents and to input his/her instruction to start the reading of the rear surfaces. The display process of S51 continues until the copy button 410 is pressed (NO in S52). Viewing the report on the display portion 420, the operator repositions the documents that are now on the discharge tray 230 (state D in FIG. 6) onto the supply tray 220, while maintaining unchanged the stack direction of the documents and the orientation of the images (bottom-to-top direction indicated by arrows in the images) (state E in FIG. 6). In this manner, by repositioning the documents without reversing their orientation (bottom-to-top direction) and their stacking direction, the documents are stacked on the supply tray 220 so that the rear-surface images VI, IV, and II face upwardly and are arranged in sequence from the top.

When operator has completed this repositioning and has pressed the copy button 410 (YES in S52), the CPU 500 checks in S53 whether or not there is some document on the tray 220 by using the document detection sensor 221 in the same manner as in S12 (FIG. 8). If no documents are detected by the document detection sensor 221, it is determined that there are no documents (NO in S53), and the display portion 420 is controlled in S55 to display a report informing the operator that there are no documents. The flow then returns to the determination processing of S51.

If some document is placed on the supply tray 220 (YES in S53), the value of the counter m is incremented by one (1) in S56. The counter m indicates that a m-th document from the top of the present stack is currently being processed in the loop of S56 to S83. The value of zero (0) has been set into the counter m during the initialization of S11. Accordingly, when the processing of S56 is first executed, the value of the counter m becomes 1, and indicates that the uppermost document is currently being processed.

The CPU 500 then determines in S57 whether or not m is smaller than or equal to the present number of the counter n. It is now assumed that the total number of the documents whose front surfaces have been properly read in S21-S36 is Nmax. The CPU 500 determines in S57 whether or not m is smaller than or equal to the number Nmax (=n) If m is greater than Nmax (NO in S57), an error message is displayed in S58 on the display portion 420 to inform that there is an abnormality in the number of documents on the rear surface side. These processes of S57 and S58 are for performing a check and for informing an error in situations such as if the operator has intended to start the reading of the rear surfaces but has added a new document by mistake to the stack so that the number of documents has increased; or if the operator fails to remove the documents, for which the reading of the front surfaces has not been executed (yes in S45, S46, S47). These situations make the judgment in S57 negative, and the error message is displayed in S58 on the display portion 420. After the process of S58, the flow proceeds to S85. In this example, the value of the counter m is one (1) when the processing of S57 is executed first, and the value of the counter n (Nmax) has become three (3) because the front surfaces of the three documents have been completely read as shown in FIG. 6, so that the m is smaller than Nmax (n) (YES in S57).

Next, in S61, the CPU 500 checks whether or not there exists an available space of greater than or equal to the rear storage capacity (rear surface available area minimum amount) in the rear-surface image data storage area 525. The determination processing of S61 is intended to check, even after the reading in of the rear surfaces has started, whether an available area presently existing in the rear-surface image data storage area 525 has an amount that is greater than or equal to the rear storage capacity (rear surface available area minimum amount).

If the available area now existing in the rear-surface image data storage area 525 has an amount smaller than the rear storage capacity (rear surface available area minimum amount) (NO in S61), the determination processing of S61 is repeated until already-stored image data is read out for printing and therefore the amount of the available area in the rear-surface image data storage area 525 increases to a value greater than or equal to the rear storage capacity (rear surface available area minimum amount).

When the amount of the available area in the rear-surface image data storage area 525 becomes greater than or equal to the rear storage capacity (rear surface available area minimum amount) (YES in S61), the program proceeds to S63, where the value of the counter m is referred to, and reading of the rear surface of the m-th document from the top of the stack starts.

As shown at state E in FIG. 6, the image VI on the rear surface of the first document is read in first. Since the repositioning from state D to state E does not change the orientation or the stacking direction of the documents, the image VI is read in line-by-line in the direction from the bottom to the top of the image (hereinafter called the "reverse direction"). The image data for the respective lines of the image VI will be stored in the rear-surface image data storage area 525 in the sequence in which the lines have been read in in the reverse direction.

In the same manner as described above for the front surfaces, the read-in image data is subjected to image processing (not shown in the drawings), is converted into binary data, and is then subjected to data compression, when required, by the compression/decompression portion 560 (YES in S65, S66). According to the present embodiment, the image data for the rear surface of each document will be read out from the storage area 525 in the same line-by-line sequence as the line-by-line sequence in which the image data is stored in the storage area 525. Accordingly, the image data can be compressed if specified by the machine-specific setting. Note that if compression is not specified by the machine-specific setting (NO in S65), the flow proceeds from S65 directly to S71.

In S71, the CPU 500 judges whether or not any available area with an amount greater than or equal to the amount of image data, which is newly read in from the rear surface of the m-th document and which is newly processed in S65-S66, exists in the rear-surface image data storage area 525.

If some available area with an amount greater than or equal to the amount of the newly-read-in image data exists in the rear-surface image data storage area 525 (YES in S71), the newly-read-in image data is stored in S75 in the rear-surface image data storage area 525.

It is noted that while the rear surface of a document is being read in during the loop of S63 to S81, it will possibly happen that a large part of the rear-surface image data storage area 525 is occupied by image data that has been read in, but image data still continues being newly read in from the rear surface of the document. In such a case, the amount of the available area in the rear-surface image data storage area 525 becomes smaller than the amount of the newly-read-in image data (NO in S71).

This happens when the amount of image data read in from the rear surface is greater than the rear storage capacity (rear surface available area maximum amount), that is, when the size of the rear surface is greater than the maximum size for the copy machine 100. For example, when the operator desires to create a copy product whose front surface is the same as that of a document (first document) and whose rear surface is the same as that of another document (second document), he/she replaces the first document with the second document after the reading in of the front surface of the first document is completed. In such a case, if the second document is larger than the maximum size document for the copy machine 100, as the second document is read in lines one by one during the loop of S63 to S81, image data continues being read in by the image reading portion 200 even when a large part of the rear-surface image data storage area 525 is occupied by image data for already-read-in lines. In this case, the amount of the available area becomes too small to store the newly-read-in image data (NO in S71).

In such a case, however, if printing is presently being executed, when image data of some amount is read out for printing from the rear-surface image data storage area 525, the space occupied by the image data will be released and an available space will be newly generated in the storage area 525. Accordingly, the CPU 500 judges in S72 whether or not image data will be read out from the rear-surface image data storage area 525 within a predetermined period of time (which will be referred to as a "limit time" hereinafter) and therefore an available space will be newly generated within the limit time, The limit time corresponds to a period of time from when one line's worth of image data is read in in S63 until the next line's worth of image data is read in S63 that is executed in the next loop of S63-S81. The limit time is therefore dependent on the read-in speed by the image reading portion 200.

If image data will be read out from the rear-surface image data storage area 525 within the limit time and therefore an available space will be newly generated within the limit time (YES in S72), the flow returns to S71 and the processings of S71 and S72 are repeated until an available area with an amount larger than or equal to the amount of the newly-read-in image data is actually generated in the storage area 525 (YES in S71).

If the amount of the available space thus becomes greater than or equal to the amount of the newly-read-in image data (YES in S71), the CPU 500 stores in S75 the newly-read-in image data into the available space.

On the other hand, if image data will not be read out from the rear-surface image data storage area 525 within the limit time and any available space will not be newly generated within the limit time (NO in S72), the flow proceeds to S73. This happens when the size of the rear surface is too large.

This happens also when the compression ratio is insufficient with respect to the size of the rear surface.

In S73, a message or the like is displayed on the display portion 420 to inform the operator that processing is interrupted due to insufficient memory. The flow then proceeds to S85.

If the image VI on the first rear surface is read in without any memory insufficiencies and image data of the image VI is stored in the storage area 525 in S75, the CPU 500 checks in S76 whether or not a recording request has already been issued to the image forming portion 300, by checking the status of the recording request flag that is stored in the recording request flag storage area 523.

If the recording request flag is in an off condition and therefore no recording request has yet been issued (NO in S76), the CPU 500 checks in S77 whether or not image data of the reference quantity "Q1$b$–Q1" has already been read in from the m-th document and stored in the storage area 525. The reference quantity "Q1$b$–Q1" is one of the machine-specific settings.

While the image data stored in the storage area 525 is less than the reference quantity "Q1$b$–Q1" (no in S77), the flow returns to S63, and reading in and storing of image data for the rear surface of the present document (m-th document) continues.

On the other hand, when the amount of image data presently stored in the rear-surface image data storage area 525 reaches the reference quantity (Q1$b$–Q1) (YES in S77), the CPU 500 issues in S78 a recording request for instructing the start of printing to the image forming portion 300 (printing program of FIG. 10). When the recording request is issued, the recording request flag is turned ON to indicate that a recording request has already been issued for the m-th document.

When the copy program issues a recording request while reading-in the rear surface of the m-th document, the image forming portion 300 produces a double-sided copy product for one double-sided document that has been originally located n-th from the top in the stack (state C in FIG. 6) when the stack is originally mounted on the supply tray 220 and that is located m-th from the top in the stack when the stack is repositioned on the supply tray (state E). In order to produce the copy product, the image forming portion 300 prints out image data from the front surface of the n-th document on one surface of a sheet of paper, and then prints out image data from the rear surface of the m-th document on the other surface of the same sheet of paper. The values n and m have a relationship of n=(Nmax+1)−m, wherein Nmax is the total number of the documents that have been read in in the loop of S21-S36. In this example, Nmax is equal to three (3), n and m have a relationship of n=4−m. That is, when m is equal to 1, n is equal to 3. When m is equal to 2, n is equal to 2. When m is equal to 3, n is equal to 1.

Accordingly, it is possible to produce an exact copy of one double-sided document that is located n-th in the stack first mounted on the supply tray 220 (state C in FIG. 6) and that is located m-th in the stack repositioned on the supply tray (state E), and to discharge the exact copy on the paper discharge tray 320 with a face-up state (sate N in FIG. 7) in the same manner as the state of the original document (state C).

The recording request includes, as variables: link data that links image data for the rear surface of the m-th document to image data for the front surface of the n-th document; storage location data indicative of the locations in the storage areas 524 and 525 where the image data indicated by the link data is stored; and order data indicating that the image data for the front surface of the n-th document should be printed out before the image data for the rear surface of the m-th document. The link data indicates that the number n has a relationship of (Nmax+1)−m with respect to the number m. In this example, when the recording request is produced in S77 for m=1, the link data indicates n=3 and m=1. When the recording request is produced in S77 for m=2, the link data indicates n=2 and m=2. When the recording request is produced in S77 for m=3, the link data indicates n=1 and m=3.

After the start of reading in of the image VI from the rear surface of the first (m=1) document and while the storing of the entire image data from the rear surface of the first (m=1) document has not yet been completed (NO in S81), the flow returns to S63 and the reading in of the rear surface of the subject document continues.

Whether or not storing of the entire image data of the rear surface of the subject document has been completed is determined based on the detection of the leading edge and the trailing edge of the document by the passage detection sensor 222 in the same manner as in S33.

Note that after the recording request has been issued in S78 in the loop of S63 to S81, the determination processing of S76 shows that the recording request flag is on (YES in S76), so the flow proceeds directly from S76 to S81.

When the reading in of the rear surface of the first (m=1) document has been completed (YES in S81), the recording request flag is turned off in S82 in preparation for printing the next document.

The CPU 500 then checks in S83 whether or not there remain any documents on the supply tray 220 based on the detection by the document detection sensor 221, and determines whether or not the reading in of all the documents has been completed.

If there remains some document on the supply tray 220 (NO in S83), the flow returns to S56, wherein the counter m is incremented by one (1), and the image IV (see FIG. 6) on the rear surface of the next (second) document is read in by the loop of S63 to S81, in the same manner as described above.

After the image IV of the rear surface of the second document has been read in, the image II of the rear surface of the third document is read in in the same manner as described above, and, when all of the documents that have been placed on the supply tray 220 have been read in and no documents remain on the tray (YES in S83), the flow proceeds to S85.

The printing is executed according to the printing program of FIG. 10 upon receipt of the recording requests in parallel with the reading in of the rear surfaces of the documents according to the copy program of FIG. 9. In S85, the copy program waits until the recording of image data based on all the recording requests has been completed (NO in S85). When the copy program receives from the print program the report that printing has completed (YES in S85), the CPU 500 executes an end processing in S86. The storage areas that have been secured in the RAM 520 for the copy program are released, and the copy program ends.

The print program will be described below with reference to FIG. 10.

As shown in FIG. 10, when the print program is started being executed, the CPU 500 waits for an arrival of a recording request (no in S110). Upon receipt of the recording request (yes in S110), the program proceeds to S120, where the CPU 500 refers to the link data indicating the values of m and n and the order data in the recording request.

The CPU 500 then reads out image data for the front surface of the n-th document, that is, the [(Nmax+1)−m]-th document from the storage area 524, and prints the thus read-out image data on one surface of a sheet of paper. It is noted that the CPU 500 reads out and prints out image data lines one by one. After completing printing of the front surface of the n-th document, the CPU 500 reads out image data for the rear surface of the m-th document from the storage area 525, and prints the thus read-out image data on the other surface of the sheet of paper. It is noted that the CPU 500 reads out and prints out image data lines one by one. While reading out and printing the image data for the rear surface of the m-th document, the print program transfers, to the copy program, information indicative of how the reading out of the image data from the storage area 525 is being presently proceeded. In S72 (FIG. 9), the copy program judges whether or not image data will be newly read out from the storage area 525 within the limit time based on the information supplied from the print program.

It is noted that if image data has been stored in the storage area 524 or 525 after being compressed by the compression/decompression portion 560, when the image data is read out for printing, the image data is decompressed by the compression/decompression portion 560 before being printed.

When completing printing image data for the rear surface of the m-th document, the program proceeds to S130, in which the CPU 500 judges whether or not the value n indicated in the recording request is equal to one (1). If n is different from one (1) (no in S130), the program returns to S110. If n is equal to one (1) (yes in S130), the print program transfers to the copy program a report that a printing has ended in S140.

In this example, the copy program of FIG. 9 issues a recording request including a link data showing m=1 and n=3 while the rear surface of the first (m=1) document is being read in. The image forming portion 300 produces a double-sided copy product for the document that is located uppermost in the stack mounted on the supply tray 220 for rear-surface reading (state E in FIG. 6) but that has been located lowermost in the stack when the stack is originally mounted on the supply tray 220 for front-surface reading (state C). The copy program issues a recording request including a link data showing m=2 and n=2 while the rear surface of the second (m=2) document is being read in. The image forming portion 300 produces a double-sided copy product for the document that is located middle in the stack mounted on the supply tray 220 for rear-surface reading (state E) and that has been located also middle in the stack when the stack is originally mounted on the supply tray 220 for front-surface reading (state C). The copy program issues a recording request including a link data showing m=3 and n=1 while the rear surface of the third (m=3) document is being read in. The image forming portion 300 produces a double-sided copy product for the document that is located bottom in the stack mounted on the supply tray 220 for rear-surface reading (state E) but that has been located uppermost in the stack when the stack is originally mounted on the supply tray 220 for front-surface reading (state C).

Next will be described the reference quantity "Q1b–Q1" in greater detail with reference to FIG. 11.

In the copy machine 100 of this embodiment, printing of a copy of one double-sided document is executed by the image forming portion 300 in parallel with the reading in of the rear surface of the subject document. In order to protect the high-voltage-charged photosensitive drum 332 from being damaged, once the image forming portion 300 has started printing onto one sheet of paper, the image forming portion 300 is prohibited from stopping the printing temporarily.

As the rear surface of one document (m-th document) is being read in, the read-in image data is stored in the rear-surface image data storage area 525. While the read-in image data is thus being stored in the storage area 525, the image data is read out from the storage area 525 to be printed on a sheet of paper. If the quantity of image data that has been read out from the storage area 525 reaches the quantity of image data that has been stored in the storage area 525, no image data remains in the storage area 525. Image data runs out from the storage area 525. In such a case, no information (a so-called NULL) will be printed on the paper.

According to the embodiment, in order to prevent the data running-out problem, the copy program is designed to manage a printing start timing (recording request issue timing of S78) based on the relationship between the speed at which read-in image data is stored in the storage area 525 and the speed at which image data is read out from the storage area 525 for printing so that image data does not run out from the storage area 525.

FIG. 11 shows a graph indicative of a relationship between an image data storing speed, at which read-in image data from the rear surface of one document is stored in the storage area 525, and an image data read-out speed, at which image data for the front surface of the subject document and for the rear surface of the subject document is read out from the storage areas 525 and 526 for printing. The horizontal axis indicates a time (t), while the vertical axis indicates quantity (q) of image data. The image data storing speed is indicated by a slope of a line segment 200a, while the image data read-out speed is indicated by a slope of other line segments 300a, 300b, and 300c. As apparent from the line segments, the image data read-out speed is faster than the image data storing speed.

In the graph of FIG. 11, a data quantity Q1 denotes the quantity of image data read in from the front surface of one document. A data quantity Q2 denotes the total quantity of image data read in from the front surface and the rear surface of the subject document. It is assumed that the image data is not compressed. The front surface and the rear surface have the same size. The quantity Q2 is therefore equal to twice the data quantity Q1. In other words, the quantity of image data read in from the rear surface of the document has also the data quantity Q1.

For example, as shown in FIG. 6, the document that has the image V on its front surface has the image VI on its rear surface. The document serves as the third (n=3) document in state C, and serves as the first (m=1) document in state E. The quantity of image data from the image V and the quantity of image data from the image VI are equal to each other and are equal to Q1.

The read-in speed, at which images are read in from documents by the image reading portion 200 can be determined by experiments or the like. Accordingly, it is possible to determine the image data storing speed, at which the read-in image data is stored in the rear-surface image data storage area 525. It is assumed that the read-in image data from the rear surface of the document starts being stored in the storage area 525 at a time T2. In such a case, it is possible to estimate, based on the image data storing speed of the line segment 200a, that the entire image data from the rear surface will be completely stored in the storage area 525 at a time T7. It is noted that the entire image data with data quantity Q1 from the front surface of the document has already been read in and stored in the storage area 524 through the processes of S21-S36 (FIG. 8) before timing T2.

Similarly, the printing speed, at which images are printed on both sides of a sheet of paper can be determined by experiments or the like. It is therefore possible to determine the image data read-out speed, at which image data is read out from the storage areas 524 and 525 for printing.

It is assumed that the image data for the front surface starts being read out from the storage area 524 at a time T0. It is possible to estimate, based on the image data read-out speed of the line segment 300*a*, that the entire image data for the front surface will be completely read out from the storage area 524 at a time T4, that the image data for the rear surface starts being read out from the storage area 525 at the time T4, and that the entire image data for the rear surface will be completely read out from the storage area 525 at a time T6.

At time T4, image data with data quantity of (Q1*a*–Q1) has been stored in the storage area 525. The image data starts being read out from the storage area 525. At time T5, the line segment 300*a* intersects the line segment 200*a*, which indicates that image data will run out from the storage area 525 at time T5 and thereafter.

In order to prevent the image data from running out, according to the present embodiment, the determination processing of S77 ensures that printing of image data does not start while the amount of image data presently stored in the rear-surface image data storage area 525 is less than the reference quantity "Q1*b*–Q1" (NO in S77).

That is, until the amount of image data presently stored in the storage area 525 does not reach the reference quantity "Q1*b*–Q1" (NO in S77), the flow returns to S63 and the reading in of the rear surface of the document continues.

More specifically, the timing of print start is delayed from T0 to T3 when the amount of image data stored in the rear-surface image data storage area 525 reaches the reference quantity "Q1*b*–Q1". The line segment 300*c* shows that when printing starts at time T3, the entire image data from the front surface and the rear surface will be completely read out from the storage areas 524 and 525 at T8 that is later than T7 when the entire image data from the rear surface will be completely stored in the storage area 525. It is therefore possible to prevent the image data from running out of the storage area 525.

It is noted that the reference quantity (Q1*b*–Q1) is previously determined by drawing the storing speed line segment 200*a* and by drawing the read-out speed line segment 300*c* as shown in FIG. 11, and the reference quantity (Q1*b*–Q1) is set as one of the machine-specific settings.

By simply comparing the amount of image data presently being stored in the storage area 525 with the reference quantity (Q1*b*–Q1), it is possible to ensure that the entire image data from the front surface and the rear surface will be completely read out from the storage areas 524 and 525 after T7 when the entire image data from the rear surface will be completely stored in the storage area 525. It is unnecessary to actually measure the time.

It is noted that in the example of FIG. 11, the reference quantity (Q1*b*–Q1) may be set to zero. That is, even when the printing starts at T2, that is, simultaneously when storing of image data from the rear surface to the storage area 525 starts, it is still possible to ensure that printing of the front and rear surfaces will be completed after storing of image data from the rear surface into the storage area 525 is completed.

It is noted that in the example of FIG. 11, the reference quantity (Q1*b*–Q1) may be set to Q1. That is, printing may be started at T7, that is, simultaneously when the entire image data from the rear surface has been completely stored in the storage area 525. It can still be ensured that printing of the front and rear surfaces will be completed after storing of image data from the rear surface into the storage area 525 is completed.

While the rear surface of each document is read in by repeatedly executing the loop of S63-S81, the recording request is issued once. In other words, while the rear surfaces of all the documents are read in by executing the loop of S63-S83 the total number of the documents' worth of times (three, in this example of FIGS. 6 and 7), the recording request is issued the total number of the documents' worth of times. Every time the recording request is issued, the print program of FIG. 10 produces a copy product of the corresponding document by the double-side copy mechanism.

As described above, according to the present embodiment, starting of printing of image data is started before the reading of both surfaces of all the documents has been completed. This enables shortening the time required for copying all the documents.

The copy machine 100 completes the reading in of the front surfaces of a plurality of documents, before starting reading in of the rear surfaces of the documents, and starts forming images before the reading in of the rear surfaces of all the documents has been completed. After the front surfaces of all the plurality of documents have been read in, the reading of the rear surfaces starts. It takes a period of time from a time T2 to a time T7 to read in image data of a quantity (Q2–Q1) from the rear surface of one document as apparent from a line segment 200*a* that is indicative of the speed at which the read-in image data is stored. The quantity (Q2–Q1) is estimated to be the same as a quantity Q1 of image data from the front surface of the same document. It is also estimated that it takes a period of time from a time T0 to a time T6 to print the double-sided data quantity Q2 as apparent from a line segment 300*a* that is indicative of a read-out speed in FIG. 11. The timing of printing start is therefore offset to ensure that the line segment 200*a* and the line segment 300*b* do not intersect with each other. This makes it possible to start printing based on image data for the rear surface of the document while the reading of the subject surface of the subject document. It is possible to prevent the image data from running out regardless of the difference between the storing speed and the read-out speed.

As described above, the copy machine 100 first reads in images of the front surfaces of all the documents and stores the image data, before starting reading in images of the rear surfaces. The printing by the image forming portion 300 proceeds in parallel with the reading in of the rear surfaces of documents. While the rear surface of one (m-th) document is being read in, a recording request is issued, as a result of which image data from the m-th rear surface that is now being read in is related to image data from the {(Nmax+1)–m}-th front surface, and the thus related two sets of image data are printed on both sides of a sheet of paper.

Thus, the copy machine 100 reads in images formed on both sides of a plurality of original documents, links image data for the read-in front surface for each document to image data for the read-in rear surface for the subject document, and then forms images on both sides of a recording medium based on the linked image data.

The printing for one document is started after the reading in of the rear surface of the subject document has been started and image data with the reference quantity or more has been stored in the rear-surface image data storage area 525. It is possible to prevent the image-data running-out problem that will possibly occur when the speed at which the copy is printed is faster than the speed at which the document is read. The copy program is compatible with various types of copy machine and multifunction devices by executing judgments based on the machine-specific settings that correspond to the unique configuration of a machine, in which the copy program is installed.

The CPU 500 checks in S61 whether or not there exists an available space of greater than or equal to the rear surface available area minimum amount in the rear-surface image data storage area 525. It is noted that the rear surface available area minimum amount is equal to the one page's worth of image data amount and because the storage capacity of the rear-surface image data storage area 525 is also equal to the one page's worth of image data amount. Accordingly, in S61, it is judged whether or not all the one page's worth of image data for the (m−1)th document has already been printed out. The program waits until all the one page's worth of image data for the (m−1)th document has been printed out (no in S61). After all the one page's worth of image data for the (m−1)th document has been printed out (yes in S61), the reading-in of the m-th document is started in S63.

In the example of FIGS. 6 and 7, the documents in the stack in each of the states C and E are read in from the uppermost document to the lowermost document. Accordingly, the images I, III, and V are read in in this order. The images VI, IV, and II are read in in this order. In this case, when printing, the images VI, IV, and II are read out and printed in this order, while the images V, III, and I are read out and printed in this order. In other words, when printing, the images for the rear surfaces are read out and printed in an order the same as the order in which the rear surfaces have been read in, while images for the front surfaces are read out and printed in an order opposite to the order in which the front surfaces have been read in.

On the other hand, the documents in the stack E may be read in from the lowermost document to the uppermost document. In this case, the images V, III, and I are read in in this order. The images VI, IV, and II are read in in this order. In this case, when printing, the images VI, IV, and II are read out and printed in this order, while the images V, III, and I are read out and printed in this order. In other words, when printing, the images for the rear surfaces are read out and printed in an order the same as the order in which the rear surfaces have been read in, while images for the front surfaces are read out and printed in an order the same as the order in which the front surfaces have been read in.

It is noted that documents in the stack may have page numbers printed on their both sides. The documents may be arranged on the supply tray 220 so that the page numbers will be arranged in an increasing order, a decreasing order, or a random order from the top to the bottom of the stack.

First Modification

It is noted that instead of setting the reference data quantity Q1b−Q1 as one of the machine-specific settings, the length of the period of time (T3−T2) may be stored as a reference period of time as one of the machine-specific settings. In such a case, the CPU 500 starts measuring time at time T2 when the CPU 500 starts reading in image data from the rear surface and storing the image data into the storage area 525.

That is, the CPU 500 employs a timer and starts measuring time at time T2 when the CPU 500 executes the process of S63 for the first time for the m-th document. In S77, instead of comparing the presently-stored image data amount with the reference data quantity Q1b−Q1, the CPU 500 compares the measured period of time with the reference period of time (T3−T2). While the period of time (T3−T2) has not yet elapsed (no in S77), the flow returns to S63. When the period of time (T3−T2) has elapsed after time T2 and therefore time T3 is reached (yes in S77), the program proceeds to S78.

It is noted that the length of time (T3−T2) may be set to zero (0). It is still possible to prevent image data from running out from the data storage area 525.

Second Modification

It is also noted that in FIG. 11, another line segment 300b shows that if image data is started from being read out for printing at time T1 that is delayed from time T0 by the amount of (T1−T0), the entire image data from the front surface and the rear surface will be completely printed out at time T7, that is, simultaneously when the entire image data from the rear surface is completely stored in the storage area 525. Because the line segment 300b does not intersect with the line segment 200a, it is still possible to prevent image data from running out from the storage area 525.

Thus, it is possible to prevent image data from running out from the storage area 525 by starting printing at a timing on or after the timing T1 relative to the timing T2 at which image data for the rear surface is started being read in into the storage area 525.

According to the present modification, therefore, the CPU 500 measures time while executing the copy program of FIGS. 8 and 9, and issues a recording request at or after timing T1 relative to the timing T2 when the CPU 500 starts reading in the surface of one (m-th) document in S63. In this case, the processes of S76, S77, S78, and S82 are omitted from the copy program of FIG. 9.

Third Modification

The storage capacity of the rear-surface image data storage area 525 is not necessarily limited to the amount of one page's worth of image data. According to this modification, the storage capacity of the rear-surface image data storage area 525 is equal to the storage capacity of the front-surface image data storage area 524. It becomes possible to read in image data for the rear surfaces of all the documents continuously in a batch.

When the front surfaces of all the documents have been read, the total number of the documents and the amount of image data from the front surfaces of all the documents are known. In addition, as described already, the read-out speed and the storing speed are known beforehand.

Figure 12B:
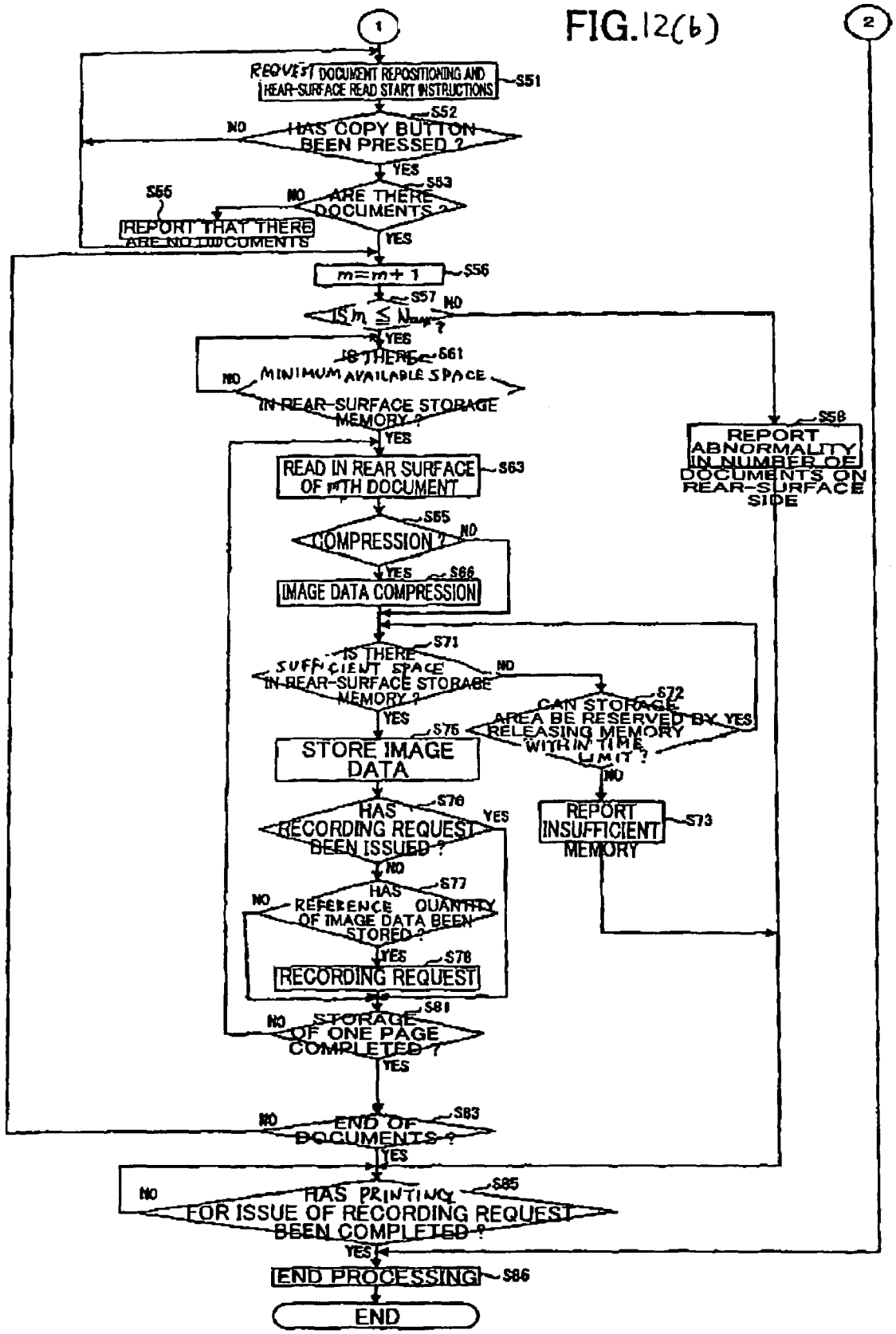
FIG. 12($a$) is a graph, according to a third modification of the embodiment, indicative of a relationship between the speed at which image data is stored into a storage area when the image data is read in, and the speed at which image data is read out for printing.

Now assume that when the front surfaces of all the first, second, and third documents have been read, as shown in FIG. 12(a), it is known that the amount of image data read in from the front surface of the first (n=1) document (image I) is Q1, that the amount of image data read in from the front surface of the second (n=2) document (image III) is Q2−Q1, and that the amount of image data read in from the front surface of the third (n=3) document (image V) is Q3−Q2. The total amount of the image data from the front surfaces of all the three documents is Q3. In this case, before starting reading the rear surfaces of the documents, it is possible to estimate that the amount of image data to be read in from the rear surface of the first (m=1) document (image VI) is Q4−Q3 (=Q3−Q2), that the amount of image data to be read in from the rear surface of the second (m=2) document (image IV) is Q5−Q4 (=Q2−Q1), and that the amount of image data to be read in from the rear surface of the third (m=3) document (image II) is Q6−Q5 (=Q1). It is therefore possible to estimate that the total amount of image data to be read in from the rear surfaces of all the three documents is Q6−Q3 (=Q3). Accordingly, it is possible to estimate that the total amount of image data to be read in from both the front and rear surfaces of all the three documents is Q6.

The line segment 200a indicative of the storing speed is drawn as shown in FIG. 12(a) to indicate that the storing of image data from the rear surfaces of the documents starts at time T0. The line segment 300a indicative of the read-out speed is drawn also in FIG. 12(*a*) not to intersect with the line segment 200*a*. It is known that if the printing of image data for all the documents is started at timing T1 when image data with the amount of (Q3*a*–Q3) read-in from the rear surfaces has been stored in the storage area 525, image data for all the documents will be completely read out for printing at timing T2 simultaneously when image data from the rear surfaces of all the documents has been completely stored in the storage area 525. It is possible to prevent image data from running out from the storage area 525.

Accordingly, in this modification, the amount of (Q3*a*–Q3) is set as the reference quantity in the machine-specific settings. The portion of the copy program shown in FIG. 9 is modified as shown in FIG. 12(*b*). As shown in FIG. 12(*b*), the process of S82 is omitted. When the judgment of S77 is negative, the program proceeds to S81 Accordingly, while the rear surfaces of all the documents are read in by executing the loop of S63-S83 the total number of documents' worth of times (three, in the example of FIGS. 6 and 7), the amount of the image data stored in the storage area 525 gradually increases from 0 to Q3 as shown in FIG. 12(*a*). When the amount of the image data stored in the storage area 525 reaches the reference quantity (Q3*a*–Q3) (no in S76, yes in S77), the CPU 500 issues a recording request in S78. Thereafter, the program goes from S76 directly to S81 (yes in S76). Accordingly, while the rear surfaces of all the documents are read in by executing the loop of S63-S83 the total number of documents' worth of times, the recording request is issued only once according to the present modification.

The recording request includes: link data indicating the relationship "n=(Nmax+1)–m" between the values m and n for all the documents ((m=1, n=3), (m=2, n=2), and (m=3, n=1) in the example of FIGS. 6 and 7); storage location data indicative of the locations in the storage areas 524 and 525 where the image data indicated by the link data is stored; and order data indicating that the image data for the front surface of the n-th document should be printed out before the image data for the rear surface of the m-th document.

According to the present modification, the print program of FIG. 10 is modified in a manner described below.

The process of S130 is omitted. The process of S120 is modified to produce double-sided copy products for all the documents successively. In this example, when the recording request is issued (yes in S110), in S120, a copy product is produced by printing the image V from the front surface of the third (n=Nmax) document and the image VI from the rear surface of the first (m=1) document on a sheet of paper and is discharged on the tray 320 as a lowermost copy product, then printing the image III from the front surface of the second (n=Nmax-1) document and the image IV from the rear surface of the second (m=2) document on the next sheet of paper and is discharged on the tray 320 as a second copy product, and then printing the image I from the front surface of the first (n=1) document and the image II from the rear surface of the third (m=3) document on the next sheet of paper and is discharged on the tray 320 as an uppermost copy product. In this way, copy products for the three documents are produced continuously. Thereafter, the flow proceeds from S120 directly to S140.

It is noted that it is possible to prevent image data from running out from the storage area 525 by starting printing at a timing on or after timing T1 (FIG. 12(*a*)) relative to the timing T0 at which image data for the rear surface is started being read in into the storage area 525. In other words, the reference quantity can be set to equal to or greater than the amount (Q3*a*–Q3).

Fourth Modification

In the above description, the order data in the recording request indicates that image data for the front surface of the n-th document should be printed out before the image data for the rear surface of the m-th document, wherein n=(Nmax+1)–m, in order to discharge the double-sided copy product on the paper discharge tray 320 with a face-up state as indicated by the state N in FIG. 7.

However, the operator can open a rear-side cover (not shown) of the copy machine 100 to control the copy machine 100 to discharge the double-sided copy product in the state M in FIG. 7 without turning upside down the copy product from the state M into the state N. In such a case, in order to discharge the copy product also in the face-up state in the same state as the original document stack, it is necessary that the image data for the rear surface of the m-th document be printed out before image data for the front surface of the n-th document. Accordingly, the order data is modified to indicate that the image data for the rear surface of the m-th document should be printed out before image data for the front surface of the n-th document.

Figure 13:
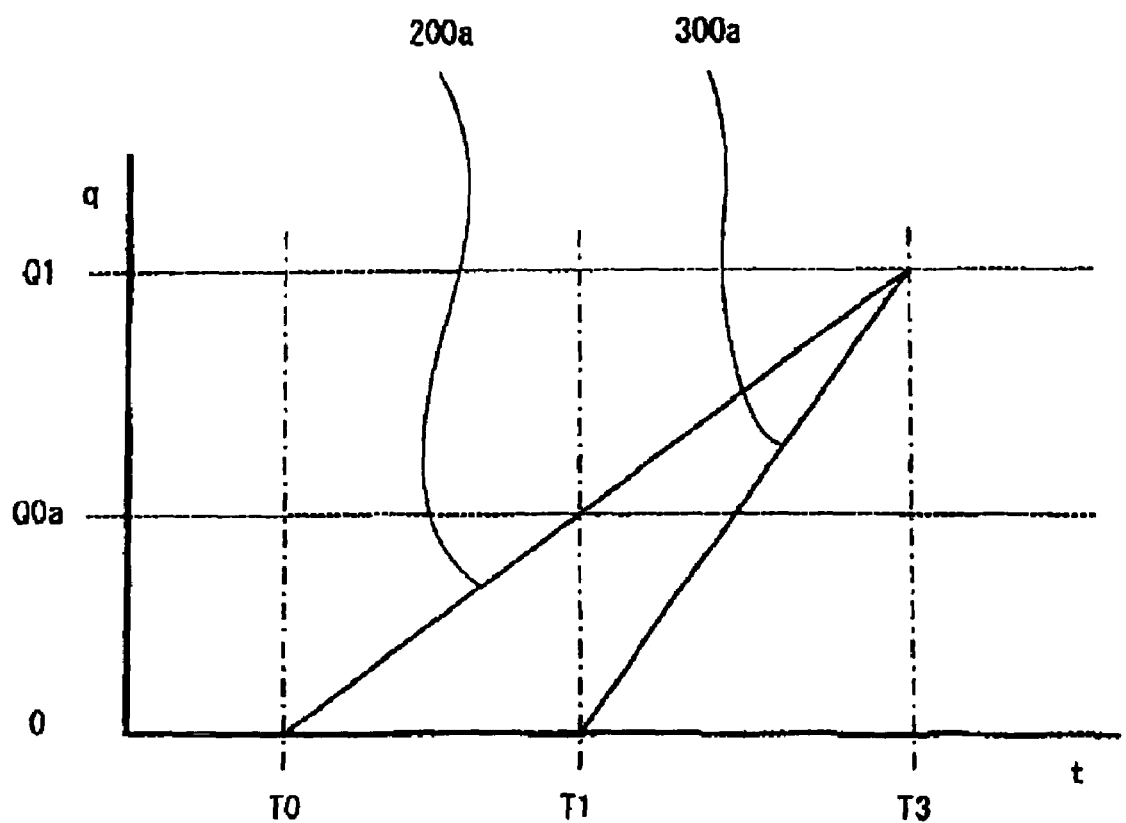
FIG. 13 is a graph, according to a fourth modification of the embodiment, indicative of a relationship between the speed at which image data is stored into a storage area when the image data is read in, and the speed at which image data is read out for printing.

The storing speed and the read-out speed are previously known. As shown in FIG. 13, it is now assumed that the amount of the entire image data to be read in from the rear surface of one document (m-th document) is Q1. Based on the storing speed, by drawing a line segment 200*a*, it is possible to estimate that if image data read in from the rear surface of the document is started being stored in the storage area 525 at timing T0, the entire image data will be completely stored in the storage area 525 at timing T3. Based on the read-out speed, another line segment 300*a* is drawn not to intersect with the line segment 200*a*. It is therefore possible to estimate that if the image data for the rear surface of the subject document is started being read out for printing at timing T1 when image data with the amount of Q0*a* has been stored in the storage area 525, the entire image data will be completely read out from the storage area 525 for printing at time T3 simultaneously when the entire image data has been completely stored in the storage area 525. It is possible to prevent the image data from running out from the storage area 525. Although not shown in the drawing, when the entire image data of the rear surface has been completely printed, the image data of the front surface of the subject document will be started being printed.

Accordingly, in this modification, the amount Q0*a* is set as the reference quantity. In S77 of FIG. 9, it is judged whether the amount of image data that has been stored in the storage area 525 reaches the reference quantity Q0*a*.

It is possible to prevent image data from running out from the storage area 525 by starting printing at a timing on or after the timing T1 relative to the timing T0 when image data for the rear surface is started being read in into the storage area 525. In other words, the reference quantity can be set to equal to or greater than the amount Q0*a*.

The present modification can be applied to devices that are other than the copy machine 100 and that should print image data for the rear surface of the m-th document before image data for the front surface of the n-th document.

Other Modifications

In the above description, the reference quantity is previously determined as a fixed value and is set as one of the machine-specific settings. However, a plurality of possible reference quantity values may be previously determined through experiments in correspondence with a plurality of possible amounts of image data to be read in from documents. The copy machine 100 is prestored with a table that indicates the plurality of reference quantity values in correspondence with the plurality of image data amounts. During a copy process, when completely reading in the front surfaces of the documents, the copy machine 100 estimates the image data amount to be read in from the rear surfaces of the documents, and refers to the table to select one reference quantity that corresponds to the image data amount to be read in from the rear surface of the documents. The copy machine 100 uses the selected reference quantity in S77.

In the above description, the copy machine 100 reads in images formed on both sides of a document, and then prints those images on both sides of a sheet of paper according to a double-sided print mechanism in order to obtain an exact copy of the original double-sided document. However, the copy machine 100 may be modified to execute a single-sided printing mechanism to print the images read in from the both sides of a single document onto the front surfaces of two separate sheets of paper.

The image forming portion 300 may employ an ink-jet recording method instead of the laser recording method, When employing the ink-jet recording method, the image forming portion 300 can halt print operation temporarily after the image forming portion 300 prints one line's worth of image data before printing the next line's worth of image. The image forming portion 300 can therefore stop printing temporarily when image data runs out from the data storage area.

More specifically, during the process of S120 (FIG. 10), if image data runs out from the storage area 525, the CPU 500 controls the image forming portion 300 to stop printing until a sufficient data amount of image data is stored in the storage area 525 through the processes of S63-S81.

In the above description, image data already stored in the storage areas 524 and 525 is overwritten by newly-read-in image data. It is possible to overwrite the newly-read-in one page's worth of image data from the rear surface of one document onto the already-stored one page's worth of image data in the storage area 525 by page unit.

However, image data already stored in the storage areas 524 and 525 may be deleted after being printed out. The newly-read-in image data is then written into the unoccupied areas in the storage areas 524 and 525.

In such a case, the CPU 500 checks in S61 whether or not there exists an unoccupied space of greater than or equal to the rear surface unoccupied area minimum amount in the rear-surface image data storage area 525. It is noted that the rear surface unoccupied area minimum amount is equal to the one page's worth of image data amount and because the storage capacity of the rear-surface image data storage area 525 is also equal to the one page's worth of image data amount. Accordingly, in S61, it is judged whether or not all the one page's worth of image data for the (m−1)th document has already been printed out and deleted. The program waits until all the one page's worth of image data for the (m−1)th document has been printed out and deleted (no in S61). After all the one page's worth of image data for the (m−1)th document has been printed out (yes in S61), the reading-in of the m-th document is started in S63.

The rear-surface image data storage area 525 is provided in the block independent from the other block in which the storage areas 521-524 are provided, and has the storage capacity equivalent to the amount of one page's worth of image data. In order to delete image data that has already been printed from the rear-surface image data storage area 525, it is possible to delete altogether the entire one page's worth of image data for the rear surface of one document from the rear-surface image data storage area 525. It is unnecessary to delete each line's worth of image data every time the subject line's worth of image data is printed. It is unnecessary to specify each storage location of each line's worth of data. It is possible to improve processing efficiency.

In the above description, the front-surface image data storage area 524 is provided together with the storage areas 521-523 in the same block, and has a variable storage capacity. However, the front-surface image data storage area 524 may be provided in another block, which is independent from the block, in which the storage areas 521-523 are provided, and is independent from the block, in which the rear-surface image data storage area 525 is provided. The front-surface image data storage area 524 may have a fixed amount of storage capacity. In order to delete image data that has already been printed from the front-surface image data storage area 524, it is possible to delete altogether all the pages' worth of image data for the front surfaces of all the documents from the front-surface image data storage area 524. It is unnecessary to delete each line's worth of image data every time the subject line's worth of image data is printed. It is unnecessary to specify each storage location of each line's worth of data. It is possible to improve processing efficiency.

Or, the front-surface image data storage area 524 and the rear-surface image data storage area 525 may be secured in the RAM 520 without partitioning the RAM 520.

In the above description, the front-surface image data storage area 524 and the rear-surface image data storage area 525 are reserved during the initialization processing of S11. However, the storage areas 524 and 525 may be reserved dynamically. In other words, during the initialization processing of S11, only the storage areas 521-523 other than the storage areas 524 and 525 are reserved in the RAM 520. Image data are read in from the front surfaces of all the documents and is stored in an available space in the RAM 520. The remaining available space is allocated for the rear-surface image data storage area 525. By executing the processings of S15, S16, S31, S61, and S71, it is possible to check the amount of the available area. It is possible to check whether an error occurs due to an insufficient storage capacity. By securing the storage areas dynamically, it is possible to allocate a large amount of storage capacity to the rear-surface image data storage area 525. It is possible to read in image data from the rear surfaces of several documents and to store the image data altogether in the storage area 525, thereby improving the processing efficiency.

The storage capacity of the rear-surface image data storage area 525 may be smaller than the amount of one page's worth of image data. Also in this case, printing may be started at time T1 or after as shown in FIG. 11. However, in this case, it is impossible to overwrite the newly-read-in one page's worth of image data onto the already-stored one page's worth of image data by page unit. It is necessary to manage image data by using pointers. First, a pointer is set to the head of the storage area 525, and image data is stored in the storage area 525 from the head toward the end of the storage area 525. Thereafter, the pointer is reset to the head again and the storage of image data continues from the head toward the end. If the read-out speed is faster than the storing speed, even when the pointer is reset to the head, image data that is stored in the vicinity of the head has been already printed. There occurs no problem even when the data in the vicinity of the head is overwritten by newly-read-in data.

While the invention has been described in detail with reference to the specific embodiment thereof, it would be apparent to those skilled in the art that various changes and modifications may be made therein without departing from the spirit of the invention.

What is claimed is:

1. An image copying device, comprising:
   a reading portion that reads in an image formed on one surface of a document;
   a storage portion that stores image data that is read in by the reading portion;
   an image forming portion that forms an image on a recording medium based on the image data stored in the storage portion;
   a reading control portion that provides control such that, when a plurality of documents having images formed on both sides thereof are to be read by the reading portion, images formed on one surfaces of the documents are read in sequentially and are stored sequentially in the storage portion, and then, after the reading in of the one surfaces of the documents is completed, images on the other surfaces of the documents are read in sequentially and are stored sequentially in the storage portion; and
   image forming control portion that reads out, from the storage portion, image data for the one surfaces of the documents and the corresponding image data of the other surfaces of the documents, that controls the image forming portion to form images sequentially on the recording medium based on the image data, and that causes the start of the forming of images on the recording medium by the image forming portion before the reading in of all of the other surfaces of the documents by the reading portion has been completed.

2. The image copying device as claimed in claim 1, wherein, for each document, the image forming control portion sets, into a pair of image data, image data for one surface of the document and image data for the other surface of the document, which is stored in the storage portion, and forms an image based on the image data for the one surface of the document on one surface of a recording medium and an image based on the image data for the other surface of the document on another surface of the recording medium.

3. The image copying device as claimed in claim 1, wherein the image forming control portion performs control in such a manner that, after the images on the one surfaces of all the documents has been read in by the reading portion, the reading of the other surfaces and the forming of images onto the recording medium by the image forming portion are executed in parallel with each other.

4. The image copying device as claimed in claim 1, wherein the image forming control portion performs control in such a manner that the forming of images onto the recording medium by the image forming portion is started after the reading of the other surfaces of the documents has started and when image data for the other surface of at least one document has been stored in the storage portion.

5. The image copying device as claimed in claim 1, wherein the image forming control portion estimates a time at which the reading in of the other surfaces of all of the documents by the reading portion will end and estimates a time at which image forming based on image data for both surfaces of all of the documents by the image forming portion will end, and offsets, based on the estimated times, the start time of image forming by the image forming portion with respect to the start time of the reading of the other surfaces of the documents by the reading portion in such a manner that the end time of the reading of the other surfaces of all of the documents is earlier than the end time of image forming based on the image data for all of the documents.

6. The image copying device as claimed in claim 1, wherein image forming based on image data for the other surface of a particular document by the image forming portion is performed before image forming based on the one surface of the particular document; and
   the image forming control portion estimates a time at which the reading in of the other surface of the document by the reading portion will end and estimates a time at which the image forming based on image data for the other surface of the particular document will end, and offsets, based on the estimated values, the start time of image forming of the other surface of the particular document by the image forming portion with respect to the start time of the reading of the other surface of the particular document, in such a manner that the end time of the reading of the other surface of the particular document is earlier than the end time of image forming based on the image data of the other surface of the particular document.

7. The image copying device as claimed in claim 1, wherein image forming based on image data for the one surface of a particular document by the image forming portion is performed before image forming based on the other surface of the particular document; and
   the image forming control portion estimates a time at which the reading in of the other surface of the particular document by the reading portion will end and estimates a time at which the image forming based on image data for both surfaces of the particular document will end, and offsets, based on the estimated values, the start time of image forming for the one surface of the particular document by the image forming portion with respect to the start time of the reading of the other surface of the particular document, in such a manner that the end time of the reading of the other surface of the particular document is earlier than the end time of image forming based on the image data of both surfaces of the particular document.

8. The image copying device as claimed in claim 1, wherein: the reading in of the other surface of a particular document and the image forming based on the image data for the other surface of the particular document are performed in parallel; and
   the image forming control portion temporally stops the operation of the image forming portion when an amount of image data for the other surface of the particular document that is to be formed by the image forming portion and that is stored in the storage portion is smaller than a reference value before the reading in of the other surface of the particular document by the reading portion has completed.

9. The image copying device as claimed in claim 1, wherein:
   the reading in of the other surface of a particular document and the image forming based on the image data for the other surface of the particular document are performed in parallel; and
   the reading control portion controls the operation of the reading portion in such a manner that the reading in of the other surface of a next document starts after the image forming of the other surface of the particular document by the image forming portion has ended.

10. The image copying device as claimed in claim 1, wherein:
   the documents include at least a first document and a last document different from the first document, the documents being arranged in a stack in a predetermined order from the first document to the last document, a page unit being defined by each surface of each document, the reading control portion controls the reading portion to sequentially read in the one surfaces of the documents in an order the same as the predetermined order, to thereby read in the one surfaces of the documents from the one surface of the first document to the one surface of the last document in sucession, and to store data for the one surfaces of all the documents in the storage portion, and controls the reading portion to sequentially read in the other surfaces of the documents in another order opposite to the predetermined order, to thereby read in the other surfaces of the documents from the other surface of the last document to the other surface of the first document in succession, and to store data for the other surfaces in the storage portion; and the image forming control portion performs control in such a manner that image data for the one surfaces of the documents that is stored in the storage portion and image data for the other surfaces of the documents that is stored in the storage portion is read out alternately in page units and images are formed by the image forming portion, and in such a manner that image data for the one surfaces is read out in an order opposite to the order in which the image data for the one surfaces of the documents have been read in by the reading portion so that the one surface of one document, which has been read in before the one surface of another document, is read out after the one surface of the other document is read out.

11. The image copying device as claimed in claim 1, wherein:

the documents include at least a first document and a last document different from the first document, the documents being arranged in a stack in a predetermined order from the first document to the last document, a page unit being defined by each surface of each document, the reading control portion controls the reading portion to sequentially read in the one surfaces of the documents in an order opposite to the predetermined order, to thereby read in the one surfaces of the documents from the one surfaces of the last document to the one surface of the first document in succession, and to store data for the one surfaces of all the documents in the storage portion, and controls the reading portion to sequentially read in the other surfaces of the documents in the order opposite to the predetermined order and to store data for the other surfaces in the storage portion; and the image forming control portion performs control in such a manner that image data for the one surfaces of the documents that is stored in the storage portion and image data for the other surfaces of the documents that is stored in the storage portion is read out alternately in page units and images are formed by the image forming portion, and in such a manner that image data for the one surfaces is read out in an order the same as the order in which the image data for the one surfaces of the documents have been read in by the reading portion so that the one surface for one document, which has been read in before the one surface of another document, is read out before the one surface of the other document is read out.

12. The image copying device as claimed in claim 1, wherein the image data stored in the storage portion is deleted after the image forming for the image data has been completed by the image forming portion.

13. The image copying device as claimed in claim 1, wherein the image forming portion is provided with a double-sided print portion that is capable of forming images on both sides of a recording medium.

14. The image copying device as claimed in claim 1, further comprising:

a supply tray that is configured to receive the documents stacked thereon in a stacking direction;

a discharge tray that is configured to receive the documents read in by the reading portion; and an informing unit;

wherein the reading portion is configured to read in surfaces of the documents that face in a predetermined direction, the reading portion reading in the surfaces of the documents in succession in a predetermined order along the stacking direction, when the documents are stacked in the stacking direction on the supply tray with their one surfaces facing in the predetermined direction, the reading control portion controls the reading portion to sequentially read in the one surfaces of the documents along the stacking direction, to store data of the one surfaces of all the documents in the storage portion, and to discharge the documents on the discharge tray so that the documents are stacked on the discharge tray with their other surfaces facing in the predetermined direction, the reading control portion controlling the informing unit to enable the user to place the documents on the supply tray while maintaining the stacking direction of the documents and while maintaining the other surfaces of the documents to face in the predetermined direction, and wherein when the documents are stacked on the supply tray with their other surfaces facing in the predetermined direction, the reading control portion controls the reading portion to sequentially read in the other surfaces of the documents along the stacking direction and to store data of the other surfaces in the storage portion; and the image forming control portion performs control in such a manner that image data for the one surfaces of the documents that is stored in the storage portion and image data for the other surfaces of the documents that is stored in the storage portion is read out alternately in page units and images are formed by the image forming portion.

15. The image copying device as claimed in claim 1, wherein the storage portion is provided with:

a first storage area that stores image data for one surfaces of the documents; and a second storage area that stores image data for the other surfaces of the documents, the first and second storage areas being independent from each other, wherein image data for the other surface of one document that has been newly read in by the reading portion is stored in the second storage area by being overwritten onto image data which has been already stored in the second storage area and for which image forming by the image forming portion has ended.

16. The image copying device as claimed in claim 15, wherein the image data is stored in the second storage area in the unit of one page, and image data for the other surface of a particular document that has been stored in the second storage area is overwritten by image data for the other surface of a next document that is read in by the reading portion next to the particular document.

17. The image copying device as claimed in claim 16, wherein image data for the other surface of each document is prohibited from being stored in the first storage area and image data for the one surface of each document is prohibited from being stored in the second storage area.

18. The image copying device as claimed in claim 15 wherein the second storage area is set to have a capacity for storing image data that is less than that of the first storage area.

19. The image copying device as claimed in claim 15, further comprising: a verification portion that checks, upon receipt of a copy instruction, available capacities of the first storage area and the second storage area, wherein the reading by the reading portion is prohibited when the available capacity of the first storage area is less than a predetermined first amount or when the available capacity of the second storage area is less than a predetermined second amount.

20. The image copying device as claimed in claim 19, wherein the reading by the reading portion is started when the verification portion has checked that the available capacity in each of the first storage area and the second storage area is larger than or equal to the capacity of image data to be read from at least one document.

21. The image copying device as claimed in claim 15, further comprising a compression portion that compresses the image data before the image data is stored in either one of the first storage area and the second storage area.

22. An image copying device, comprising:

a reading portion that reads in an image formed on one surface of a document;

a storage portion that stores image data that is read in by the reading portion;

an image forming portion that forms an image on a recording medium based on the image data stored in the storage portion; and a controller that provides control such that, when a plurality of documents having images formed on both sides thereof are to be read by the reading portion, images formed on one surfaces of the documents are read in sequentially and are stored sequentially in the storage portion, and then, after the reading in of the one surfaces of the documents is completed, images on the other surfaces of the documents are read in sequentially and are stored sequentially in the storage portion, and that reads out, from the storage portion, image data for the one surfaces of the documents and the corresponding image data of the other surfaces of the documents, that controls the image forming portion to form images sequentially on the recording medium based on the image data, and that causes the start of the forming of images on the recording medium by the image forming portion before the reading in of all of the other surfaces of the documents by the reading portion has been completed.

* * * * *